(12) United States Patent
Zheng et al.

(10) Patent No.: US 11,071,047 B2
(45) Date of Patent: Jul. 20, 2021

(54) SYSTEMS AND METHODS FOR REDUCED NETWORK SIGNALLING BASED ON MAPPING

(71) Applicants: Zhongming Zheng, Kanata (CA); Hang Zhang, Nepean (CA); Ming Jia, Ottawa (CA); Xu Li, Nepean (CA)

(72) Inventors: Zhongming Zheng, Kanata (CA); Hang Zhang, Nepean (CA); Ming Jia, Ottawa (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/447,347

(22) Filed: Jun. 20, 2019

(65) Prior Publication Data

US 2019/0394713 A1 Dec. 26, 2019

Related U.S. Application Data

(60) Provisional application No. 62/688,895, filed on Jun. 22, 2018.

(51) Int. Cl.
*H04W 48/16* (2009.01)
*H04W 56/00* (2009.01)
*H04W 48/12* (2009.01)

(52) U.S. Cl.
CPC ....... *H04W 48/16* (2013.01); *H04W 56/0015* (2013.01); *H04W 48/12* (2013.01)

(58) Field of Classification Search
CPC .. H04W 48/16; H04W 56/0015; H04W 48/12
See application file for complete search history.

(56) References Cited

U.S. PATENT DOCUMENTS

| 2007/0153758 | A1 | 7/2007 | Kang et al. |
| 2008/0045234 | A1* | 2/2008 | Reed ............... H04W 4/023 455/456.1 |
| 2013/0003690 | A1 | 1/2013 | Kim et al. |
| 2013/0114557 | A1 | 5/2013 | Kim et al. |
| 2013/0250911 | A1* | 9/2013 | Kwon ............ H04W 56/0005 370/331 |
| 2015/0358917 | A1 | 12/2015 | Gao et al. |

(Continued)

FOREIGN PATENT DOCUMENTS

| CN | 101102121 A | 1/2008 |
| CN | 101547242 A | 9/2009 |

(Continued)

*Primary Examiner* — Yemane Mesfin
*Assistant Examiner* — Henry Baron

(57) ABSTRACT

An aspect of the disclosure provides a method of network access discovery by a core network function. The method includes receiving information from a plurality of user equipment via at least one access node. The information is associated with the locations of UE, wherefrom, the plurality UE send the information. The information includes uplink transmission parameters for connecting the plurality of UE to a network. Examples of these parameters include power level and time advance. The method further includes generating at least one map based on the received information. Another aspect of the disclosure provides for sending at least one generated map to a plurality of user equipment.

23 Claims, 29 Drawing Sheets

(56) References Cited

U.S. PATENT DOCUMENTS

| | | | | |
|---|---|---|---|---|
| 2019/0191330 A1* | 6/2019 | Dao | ..................... | H04W 28/06 |
| 2019/0357272 A1* | 11/2019 | Lim | ..................... | H04W 76/19 |
| 2019/0364492 A1* | 11/2019 | Azizi | ................... | H04W 4/029 |

FOREIGN PATENT DOCUMENTS

| | | | |
|---|---|---|---|
| CN | 101790189 | A | 7/2010 |
| CN | 105637908 | A | 6/2016 |
| CN | 106714260 | A | 5/2017 |
| CN | 107592622 | A | 1/2018 |
| CN | 107864507 | A | 3/2018 |
| CN | 107889153 | A | 4/2018 |
| CN | 108093361 | A | 5/2018 |
| WO | 2013075004 | A1 | 5/2013 |
| WO | 2014111747 | A2 | 7/2014 |
| WO | 2017024464 | A1 | 2/2017 |

* cited by examiner

| 200 | 215: [x1,y1,z1] | 220: Tracking area ID | 225: RNA ID | 230: Cell ID 1 | 11210: Carrier / frequency band | 11225: Historical connection statistics | 11240: Power Level | 11255: Time advance | 11270: Load Statistics | 11285: MCS given the load statistics | 11305: Packet size | 11320: Multiple Access Scheme |
|---|---|---|---|---|---|---|---|---|---|---|---|---|
| 210: Entry 1 | | | | 335: Cell ID 2 | 11215: Carrier / frequency band | 11230: Historical connection statistics | 11245: Power Level | 11260: Time advance | 11275: Load Statistics | 11290: MCS given the load statistics | 11310: Packet size | 11325: Multiple Access Scheme |
| | | | | 240: Cell ID 3 | 11220: Carrier / frequency band | 11235: Historical connection statistics | 11250: Power Level | 11265: Time advance | 11280: Load Statistics | 11300: MCS given the load statistics | 11315: Packet size | 11330: Multiple Access Scheme |
| | 255: [x2,y2,z2] | 260: Tracking area ID | 265: RNA ID | 270: Cell ID 4 | 12210: Carrier / frequency band | 12225: Historical connection statistics | 12240: Power Level | 12255: Time advance | 12270: Load Statistics | 12285: MCS given the load statistics | 12305: Packet size | 12320: Multiple Access Scheme |
| 250: Entry 2 | | | | 275: Cell ID 5 | 12215: Carrier / frequency band | 12230: Historical connection statistics | 12245: Power Level | 12260: Time advance | 12275: Load Statistics | 12290: MCS given the load statistics | 12310: Packet size | 12325: Multiple Access Scheme |
| | | | | 280: Cell ID 6 | 12220: Carrier / frequency band | 12235: Historical connection statistics | 12250: Power Level | 12265: Time advance | 12280: Load Statistics | 12300: MCS given the load statistics | 12315: Packet size | 12330: Multiple Access Scheme |
| ……. | | | | | | | | | | | | |

Figure 2

SYSTEMS AND METHODS FOR REDUCED NETWORK SIGNALLING BASED ON MAPPING

CROSS-REFERENCE TO RELATED APPLICATIONS

This application claims the benefit of the prior-filed provisional patent application in the United States, with application Ser. No. 62/688,895, filed on Jun. 22, 2018 and entitled "SYSTEMS AND METHODS FOR REDUCED NETWORK SIGNALLING BASED ON MAPPING", the contents of which are incorporated herein by reference in their entirety.

FIELD OF THE INVENTION

The present invention pertains to the field of network communications, and in particular, towards systems and methods that provide fast and energy efficient network discovery.

BACKGROUND

Current wireless communication terminals employ measurement or physical wireless cell search to establish a connection with a wireless cell. However, physical wireless cell search and measurement are not suitable for 5G New Radio (NR) wireless communication networks. For example, in a heterogeneous 5G NR network, signals from large cells are much stronger than signals from small cells. As a result, a wireless communication terminal using measurement is unlikely to be able to measure the signal of a small cell in the presence of stronger large cell's signals. Also, wireless communication terminals employing physical cell search or measurement are likely to consume a significant amount of power and time as they decode signals from the numerous cells in ultra-dense enhanced Machine Type Communication (eMTC), narrow band (NB) internet of things (IoT), or high mobility networks such as vehicle to everything (V2X).

This background information is provided to reveal information believed by the applicant to be of possible relevance to the present invention. No admission is necessarily intended, nor should be construed, that any of the preceding information constitutes prior art against the present invention.

SUMMARY

An aspect of the disclosure provides a network function, such as an application Map Management (AMapM) network function for managing map based information. Such a network function can be instantiated in a network element, which includes at least one network interface for communicating with other network functions of a wireless network, a processor, and non-transitory machine readable memory. The non-transitory machine readable memory stores machine executable instructions, which when executed by the processor cause the AMapM function to perform a method of map management. The instructions configures the AMapM function to create and maintain a global map (GMap) database of network components and parameters correlated by geographic information, receive ongoing information regarding terminals accessing the wireless network, and send local map (LMap) database information to an access node, the LMAP created or updated according to the GMap database and the ongoing information. In some embodiments, AMapM may be collocated or integrated with the RAN node or a controller that controls or manages the RAN node and LMap is directly generated for the RAN node. In some embodiments, the parameters include synchronization parameters and uplink transmission parameters. In some embodiments, uplink transmission parameters include power level and Time Advance (TA). In some embodiments, the machine executable instructions further cause the AMapM function to use the GMap database and the ongoing information to create, update and send User Equipment (UE) map (UMap) database information to each UE whose mobility information places the UE within the serving area of multiple access nodes. In some embodiments, the ongoing information includes traffic load, accessibility, pre-configured handover information. In some embodiments, the AMapM function is configured to send updated UMap information responsive to a load balancing criteria is met. In some embodiments, the machine executable instructions further cause the AMapM function to use the GMap database and the ongoing information to create, update and send instructions to a given access node to create, update and send UMap database information to each UE whose mobility information indicates the UE is within the serving area of the given access node. In some such embodiments, the mobility information indicates the UE will remain within the serving area. In some such embodiments, the mobility information indicates the UE is solely within the serving area. In some embodiments, the at least one network interface includes a network interface for receiving mobility information from an access and mobility management function. In some embodiments, the at least one network interface includes a network interface for communicating with a network data analytics function (NWDAF). In some embodiments, the ongoing information is received from the NWDAF. In some embodiments, the machine executable instructions which cause the AMapM function to create and maintain the GMap database causes the AMapM function to cooperate with the NWDAF function in creating and updating the GMap database. In some embodiments, the AMapM functionality may be implemented or provided by the NWDAF, in which the signalling (between the AMapM function and the NWDAF) is internal (logical) or not needed. In some embodiments, the NWDAF provides historical connection statistics used to prioritize cell search candidates in the GMap and/or LMap and/or UMap databases. In some embodiments, the at least one of the AMapM function and the NWDAF incorporates artificial intelligence to learn patterns of network usage (historical connections) and UE mobility.

An aspect of the disclosure provides a network element such as an Access Node for the interconnection of a plurality of network elements. Such an element includes at least one network interface for communicating with an application Map Management (AMapM) network function of a wireless network and with a number of user equipment (UEs), a processor, and non-transitory machine readable memory. The non-transitory machine readable memory stores machine executable instructions, which when executed by the processor cause the access node to receive a local map (LMap) database received by the AMapM. The instructions further configure the Access Node to forward ongoing information regarding UE accessing the wireless network to at least one of a the AMapM function and a data analytics function. The instructions further configure the Access Node to send UE map (UMap) database information to each UE served by the access node. In some embodiments, at least some of the UMaps are received from the AMapM function. In some embodiments, at least for UEs solely served by the access node, the Access node is configured to update UMaps. In some embodiments, the UMap includes uplink transmission parameters including power level and Time Advance (TA). In some embodiments, the Access node is configured to co-operate with the UE to save time and energy in cell searching and synchronizing by utilizing TA information stored in the UMap. In some embodiments, the access node implements handover initiated by the UE based on pre-configured handover information stored in the UMap. In some embodiments, the Access node is further configured to receive updates to the LMap from the AMapM.

Another aspect of the disclosure provides a UE configured to receive a UE Map (UMap) from an access node, the UMap including time advance (TA) information and utilize the UMap, including TA information in the UMap and location information. The UMap, including TA information in the UMap can be used during at least one of: cell selection; cell reselection; cell camping; Random Access Channel (RACH) synchronization; and handover. In some embodiments the UMap includes pre-configured handover information; and the UE is configured to initiate handover in accordance with the UE's location and the pre-configured handover information

BRIEF DESCRIPTION OF THE FIGURES

Further features and advantages of the present invention will become apparent from the following detailed description of embodiments, taken in combination with the appended drawings, in which:

FIG. 2 illustrates the content fields of an Artificial Intelligence based advanced Map (AMap), according to an embodiment of the present invention;

It will be noted that throughout the appended drawings, like features are identified by like reference numerals.

DETAILED DESCRIPTION

Figure 1:
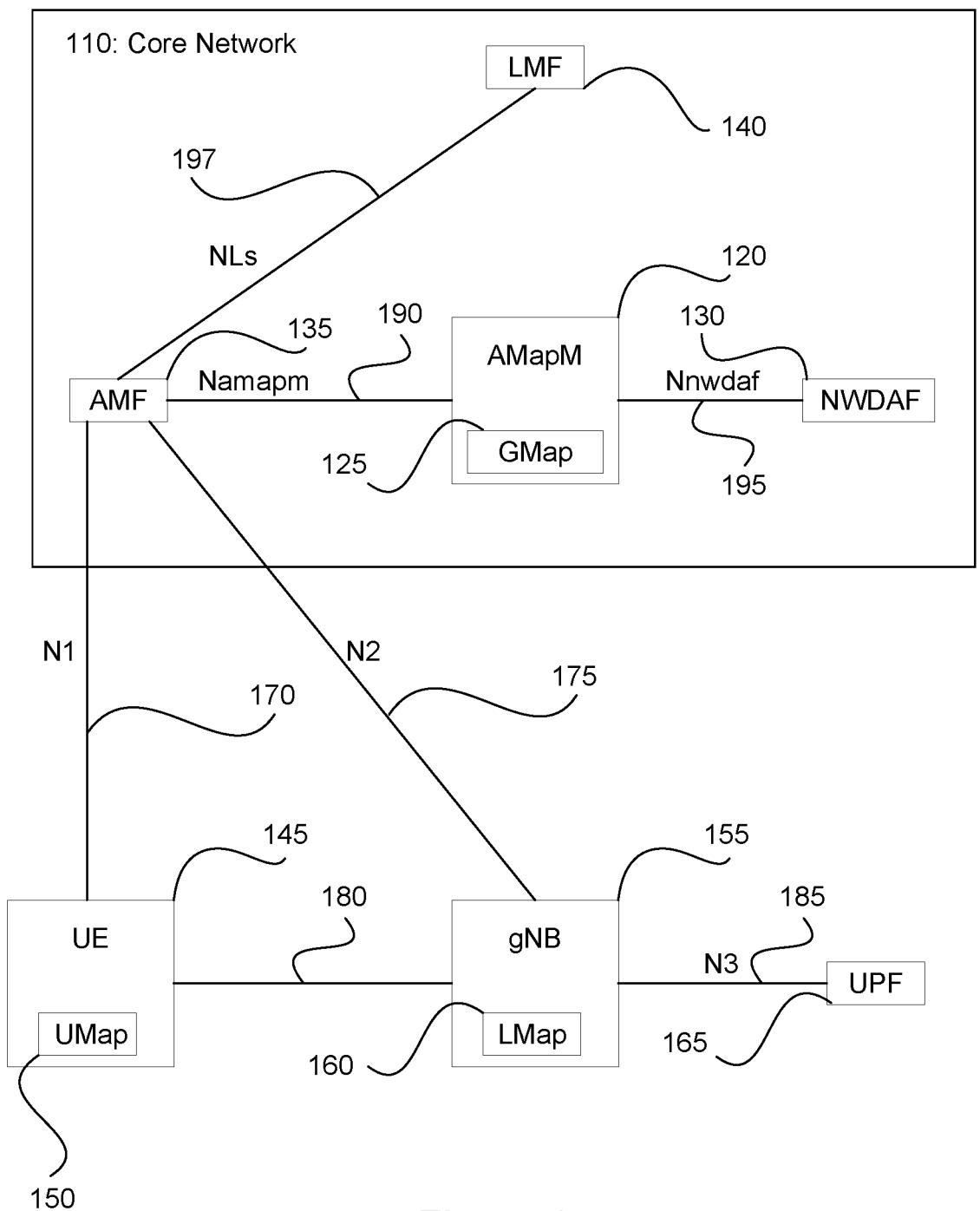
FIG. 1 illustrates a functional network architecture, according to an embodiment of the present invention.

Deployed networks are composed of a plurality of cells where each cell is associated with a specific carrier and each cell includes a Radio Access Network (RAN). The geographic area where the RAN transmits and receives radio signals defines the cell's coverage area. When a terminal comes into close physical proximity with a network, it searches the network using one of many methods, for example Random Access Channel (RACH), and synchronizes itself with, and connects to, one or more of the network's RANs. Synchronization requires that the terminal be within one or more of the network's cell's coverage area so that the terminal is able search for the network's RAN's downlink synchronization parameters and uplink transmission parameters. A terminal is required to know these parameters for it to synchronize with one or more of the network's RANs at a specific geographic location. Uplink transmission parameters include power level and timing (for example, Time Advance (TA)). The term "terminal" is the specification that generally includes wireless devices which communicate with the wireless device, and includes user equipment (UE) and other wireless devices not associated with a user, such as IoT devices, etc. Further, as a short form the term UE in this specification can refer to all types of terminals, including devices not typically associated with a user.

A terminal's synchronization can be made more time and energy efficient when the network provides the terminal with a Map upon the terminal's entry into the network's cell's coverage area. The term "Map" includes a RAN uplink transmission parameters and downlink reception synchronization parameters for geographic locations. In other words a Map is a database or table of parameters for geographic locations. If the terminal knows its geographic location, it can use this location information as an index into a stored Map to obtain the uplink and downlink parameters required to synchronize the terminal with the network's base stations providing cell coverage for the terminal's geographic location. As a result, providing a Map to the terminal leads to efficiency because the terminal can use the Map to synchronize with RANs as it enters a new network or moves within the network coverage area. This can reduce the time and energy expended during the above described RAN search procedure. Providing such a Map can also enable more efficient handover and state transition. In this specification, the term gNB will be used as an example of an access node, but it should be appreciated that other access nodes/base stations can be used.

As stated, Map can be considered to be a table of RAN uplink transmission parameters and downlink reception synchronization parameters at a specific geographic location. The Map is a generic term that includes the Artificial Intelligence (AI) based advanced Map (AMap), global AMap (GMap) stored in the application Map Management (AMapM) node, the local area AMap (LMap) stored in the 3GPP next generation Node Bs (gNB), and the user stored AMap (UMap) stored in the network's User Equipment (UE) nodes. In some embodiments the GMap can be stored outside of, but accessible by the AMapM node.

It is noted that examples are given with respect to gNBs, but it should be appreciated that the principles discussed herein apply to other types of RAN access nodes.

The LMap and UMap each contain a subset of the GMap's information. The GMap is created by the network using a four step process where a collection timer is setup, data is collected, the data is then analyzed, and the data content of the GMap is refined.

The collection timer is configured by the AMapM according to the scenario, e.g., rural area, densely deployed area, and etc.

As previously described, terminals determine uplink and downlink parameters associated with a specific geographic location for all of the RANs it was able to detect during its RAN search procedure. The uplink and downlink parameters and associated geographic location are transmitted by the UEs and gNBs to the AMapM. The geographic location is the location of the UE and the uplink and downlink parameters are the parameters required for the UE, at the specified geographic location, to synchronize with, connect to, and transmit to the RAN within the gNB.

FIG. 1 illustrates a network architecture according to an embodiment. As shown in FIG. 1, GMap 125 is stored in the AMapM 120. GMap 125 includes map data from multiple gNBs in a network area. In some embodiments, the AmapM function 120 creates and stores a GMap 125 which includes map data related to the entire network. In some embodiments the AmapM function 120 creates and stores a separate GMap for each domain, should a large network be subdivided into domains. LMap 160 is stored in gNB 155 and includes Map data related to the coverage of this gNB 155. UMap 150 is the AMap stored in UE 145 for the UE to use to synchronize with, connect to, and transmit data to the RAN in gNB 155.

The AMapM creates a GMap that includes location and uplink and downlink parameters optimized for multiple gNBs in a network area. In some embodiments the GMap is created and updated for an entire network. For large networks divided into administrative domains, a GMap may be used for each domain. In some embodiments which utilize network slicing, a GMap may be maintained for each slice. In some embodiments, there can be an AMapM function instantiated for each slice or domain. In some embodiments, a GMap is network slice aware and has the knowledge of the relationship between network slices with each GMap entry. NWDAF co-operates with the AMapM to constantly refine the GMap's data content by analyzing ongoing information received from Access Nodes and other network functions (e.g., received location and parameter data). The ongoing information can include input from the NWDAF. For example, the NWDAF co-operates with the AMapM to refine the content fields of GMap, while AMapM finally creates and updates the GMap based on refined content fields. In some embodiments the GMap is a database to which both the AMapM and the NWDAF can update fields. In the examples discussed herein, it is assumed that the NWDAF is configured to analyze large amounts of data (e.g., the ongoing information). Accordingly, the ongoing information is collected by access nodes and other network functions and sent to NWDAF to analyze and refine the Map content. In some such embodiments, as the NWDAF is so configured, the AMapM need not be configured with the intelligence to analyze and refine the GMap. However it should be appreciated that in some embodiments, the AMapM function can be configured with this analysis capability.

In some embodiments one of the AMapM and the NWDAF uses machine learning, or AI, to analyze received ongoing information (including the location and uplink and downlink parameters received from the UEs and gNBs, and other network functions). Factors used by the AI for refinement of the GMap's data include the UE's mobility information and capability category. Refining data may be used interchangeably with aggregating data, for example, aggregating data to perform statistical analysis such as determining mean and median.

FIG. 2 illustrates an example AMap (which may be used as a Gmap) 200, according to an embodiment. It should be noted that Amap is a general term for an advanced map as explained elsewhere herein, and Gmap, Lmap and Umap are all examples of AMaps. In some embodiments the GMap 200 will also include a GMap version and/or Update information fields. These data fields are compiled from the ongoing information received from multiple UE locations and their associated RAN communication parameters. Entry 1 210 in GMap 200 illustrates the optimized parameters as for a plurality of gNBs discovered by UEs at location [x1, y1, z1] 215 during RAN search procedures performed over time. Tracking area ID (TAID) 220 is the TAID associated with AMap entry 1 210. RAN-based Notification Area (RNA) ID 225 is the RNA ID associated with AMap entry 1 210. The RNA ID and TAID are stored in AMap to reduce downlink monitoring of boundary crossings associated with these identified RNA and tracking area boundary crossings. The data of multiple fields associated with each gNB, discovered by the UE at a specific location, are stored in AMap 200 when the AMap is initially created. Over time, NWDAF co-operates with the AMapM to continuously analyze the data in the GMap 200 data fields and optimizes the data in these fields, in some embodiments using AI. The Cell ID 1 field 230 is the cell ID of a gNB discovered by the UE at location [x1, y1, z1] 215. Carrier/frequency band 11210 is the optimized carrier (or frequency) a UE can use for synchronization, reception, and transmission from/to the RAN in the cell with cell ID 1 230. The Historical connection statistics 11225 data field is a derived field updated by the NWDAF based on data received from, and transmitted to the RAN in the cell with cell ID 1 230. The Power level 11240 data field contains the optimized power of the signal required for communication with the RAN in the cell with cell ID 1 230. The Time Advance 11255 field contains the optimized amount of time offset required to align data transmitted to the RAN in the cell with cell ID 1 230. The Time Advance (TA) offset time is closely related to the distance between the UE and the RAN. The Load Statistics 11270 field contains the optimized load of the RAN in cell with cell ID 1 230. The Modulation and Code Scheme (MCS) given the load statistics 11285 data field is used together with the data in the load statistics 11270 field to reduce the possibility of unnecessary reselection. Historical connection statistics, power level, Time advance and load statistics can be optimized by NWDAF. With the volume of collected data increased, NWDAF learns from the collected data and can continuously refine and optimize these fields. In some embodiments, these fields can enable faster UE connection establishment. The Packet size fields are optional. Packet size 11305 field contains the Packet size that has been determined can be reliably transmitted to the RAN in the cell with cell ID 1 230 from location [x1, y1, z1] 215. The Multiple Access Scheme 11320 field identifies the Multiple Access Scheme associated with a UE connecting to a RAN in the cell with cell ID 1 230.

In some embodiments, Time advance (TA) and Power Level (PL) can be used to speed up UL transmission. Usually, before a UE's UL traffic data transmission, a number of round trials are exchanged between a UE and the access node (RAN) to obtain the correct UL power level and Time advance of a UE, for a given position. However, in embodiments, after aMAP manager collects sufficient statistic data from UE and RAN nodes, a clear relation between position/location and TA/PL become available for a given position (location). Such information is included in the MAP and used for UE UL data transmission. This can lead to a reduction of the TA trials, as many of the trials can now be replaced by a data lookup of the TA/PL fields from the UMap. In some embodiments, apart from updating the map information, all of the potential rounds of trials can be completely avoided. In some embodiments, the TA/PL are used by UE to determine its UL transmission power and time advance, for a given position/location. Accordingly the UE can directly transmit UL traffic data using the identified TA/PL without requiring the conventional TA trials before transmitting. In some embodiments, the TA/PL can be used for UE UL transmission at any RRC state (RRC_CONNECTED, RRC_INACTIVE, RRC_IDLE)

Carrier/frequency band 11215, Historical connection statistics 11230, Power level 11245, Time advance 11260, Load statistics 11275, MCS given the load statistics 11290, Packet size 11310, and Multiple Access Scheme 11325 are the optimized parameters associated with a UE at location [x1, y1, z1] 215 for synchronization with, reception from, and transmission to the RAN in the cell with cell ID 2 335.

Carrier/frequency band 11220, Historical connection statistics 11235, Power level 11250, Time advance 11265, Load statistics 11280, MCS given the load statistics 11300, Packet size 11315, and Multiple Access Scheme 11330 are the optimized parameters associated with a UE at location [x1, y1, z1] 215 for synchronization with, reception from, and transmission to the RAN in the cell with cell ID 3 240.

Entry 2 250 in AMap 200 illustrates the optimized parameters as for a plurality of gNBs discovered by a UE at location [x1, y1, z1] 255 during RAN search procedures performed over time. Tracking area (TA) ID 260 is the TA ID associated with AMap entry 2 250. RNA ID 265 is the RNA ID associated with AMap entry 2 250. Carrier/frequency band 12210, Historical connection statistics 12225, Power level 12240, Time advance 12255, Load statistics 12270, MCS given the load statistics 12285, Packet size 12305, and Multiple Access Scheme 12320 are the optimized parameters associated with a UE at location [x2, y2, z2] 255 for synchronization with, reception from, and transmission to the RAN in the cell with cell ID 4 270.

Carrier/frequency band 12215, Historical connection statistics 12230, Power level 12245, Time advance 12260, Load statistics 12275, MCS given the load statistics 12290, Packet size 12310, and Multiple Access Scheme 12325 are the optimized parameters associated with a UE at location [x2, y2, z2] 255 for synchronization with, reception from, and transmission to the RAN in the cell with cell ID 5 275.

Carrier/frequency band 12220, Historical connection statistics 12235, Power level 12250, Time advance 12265, Load statistics 12280, MCS given the load statistics 12300, Packet size 12315, and Multiple Access Scheme 12330 are the optimized parameters associated with a UE at location [x2, y2, z2] 255 for synchronization with, reception from, and transmission to the RAN in the cell with cell ID 6 280.

Figure 3:
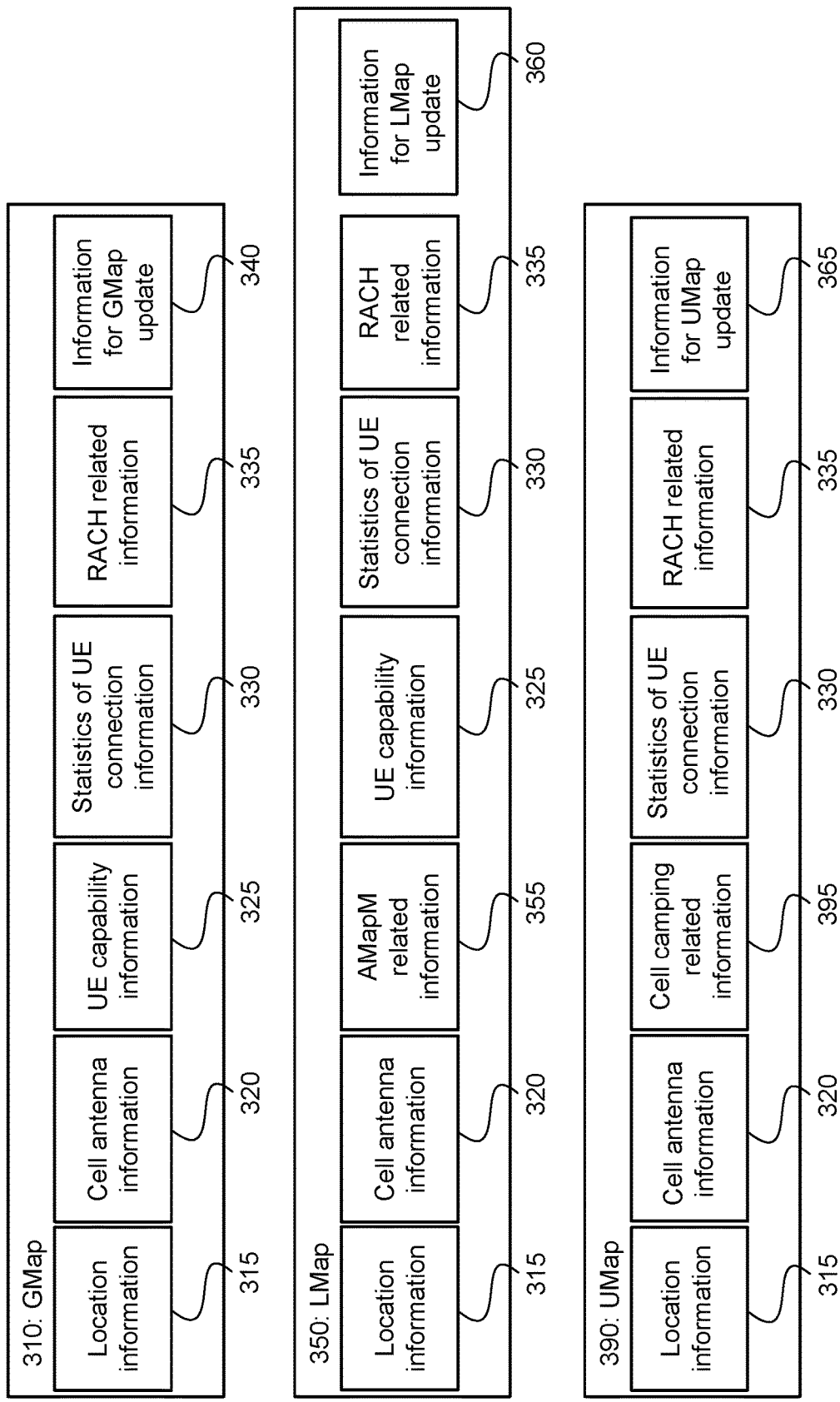
FIG. 3 illustrates the content fields of a Global AMap (GMap), local AMap (LMap), and user AMap (UMap) according to an embodiment of the present invention.

FIG. 3 illustrates the data fields of the GMap 310, LMap 350, and UMap 390. The GMap 310's fields are the location information 315 field, cell antenna information 320 field, UE capability information 325 field, statistics of UE connection information 330 field, RACH related information 335 field, and information for GMap Update 340 field.

The LMap 350's fields are the location information 315 field, cell antenna information 320 field, AMapM related information 355 field, UE capability information 325 field, statistics of UE connection information 330 field, RACH related information 335 field, and information for LMap Update 360 field.

The UMap 390's fields are the location information 315 field, cell antenna information 320 field, cell camping related information 395 field, statistics of UE connection information 330 field, RACH related information 335 field, and information for UMap Update 365 field. The RACH related information field 335 includes power level and time advance.

Examples of the data in GMap 310 location information 315 field, LMap 350 location information 315 field, and UMap 390 location information 315 field are geographic grid and relative location. Geographic grid is the UE's actual geographic location. Relative location is the relative distance or direction from other devices or land marks.

Examples of cell antenna information are the Physical Cell ID (PCI) in the local area, the Cell ID of the gNB, the carrier frequency used by the cell, and the orientation of the antenna.

Examples of the UE capability information are the Radio Access Technology (RAT) supported by the UE, the carrier frequencies supported by the UE's antennas, and the physical area the UE can access.

Examples of statistics of UE connection information include the statistics of the MCS used by the UE for uplink communication, the Historical Connection Statistics (HCS) including the percentage of time during the measured statistics where the UE was connected to the corresponding gNB, and the Overload Statistics describing the status that the cell is overloaded (only in the GMap).

Examples of RACH related information include the Multiple Access scheme used for uplink transmission (for example Non Orthogonal Multiple Access (NOMA) and Orthogonal frequency-division multiple access (OFDMA), Time Advance information including the offset time used by the UE to adjust transmission time, and transmission Power Level used by the UE to transmit to the associated RAN in the gNB.

Example of AMapM information is the AMap Manager Identifier (only in LMap).

Example of information in the information for GMap update 340 field, information for LMap update 360 field, and information for UMap update 365 field is the expiration timer corresponding to AMap update and the time interval when the data in the GMap, LMap and UMap are updated.

Example of cell camping related information indicates if the user will camp on this cell, at the UE's current geographic location, when no suitable cell in the UMap is found.

The AMapM creates and revises the data in the GMap, creates and updates custom LMaps for each gNB, and generates custom UMaps for each UE based on the UE's predicted mobility shape crosses multiple gNBs in the network.

The gNBs store the LMap sent to them by the AMapM and updates the data in their stored LMap as the contents of the received LMap are modified by AMapM. gNBs also create customized UMaps for each of the UEs which have a predicted mobility shape within the current gNB.

The UEs store the UMap sent to them by the gNB or the AMapM. The UEs use the stored UMap for cell reselection, handover, and state transition.

Figure 4:
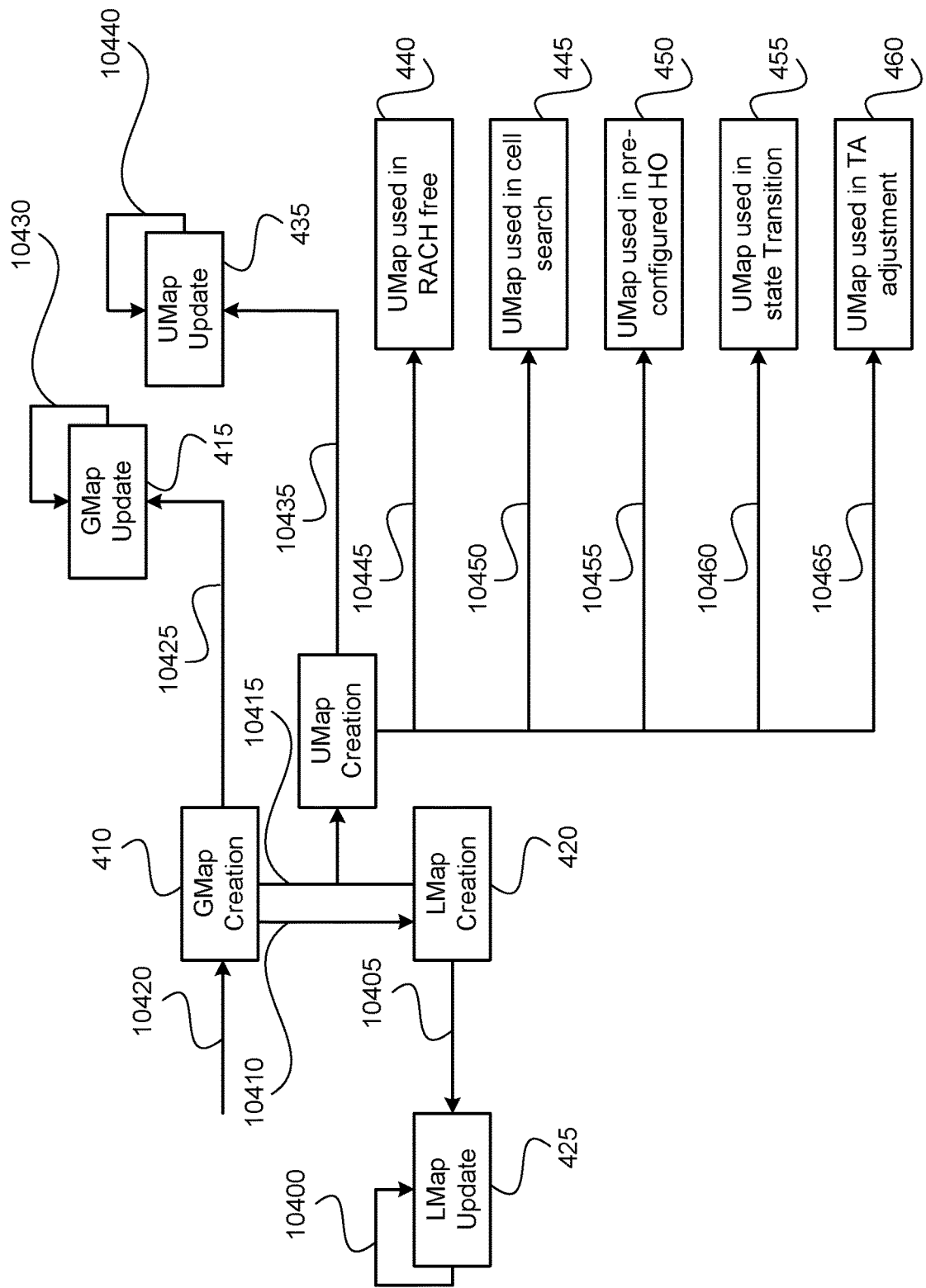
FIG. 4 illustrates the method used to create a GMap, according to an embodiment of the present invention.

The detailed operation of the generation of the GMap, LMap, and UMap is illustrated in FIG. 4. The GMap created 410 when AMap creation is triggered by signal 10420. The contents of the GMap's data fields are continuously updated based on the AI learning. The AI continuously learns about the downlink synchronization and uplink transmission parameters associated with various UE geographic locations based on the information received from the UEs and gNBs. Updating the contents of the AMap triggers updating the contents of the GMap. Signal 10425 triggers GMap Update 415 when the AMapM updates the contents of the AMap based on receiving new parameters associated with various UE geographic locations. GMap Update 415 can also be triggered by signal 10430 when the AMapM is triggered to update the AMap by the collection timer.

In FIG. 4, GMap update 415, is triggered by AMapM when the update timer expires via signal 10425. GMap update 415 is also triggered when the scenario is modified and triggered by signal 10430. GMap update 415 causes the AMapM to request all gNBs in the GMap to collect data and send it to the AMapM. AMapM uses the newly received data from the gNBs. AMapM then sends collected data to the NWDAF for analysis and refinement. NWDAF send back the refined data for AMapM to update the GMap In FIG. 4, LMap creation 420, includes four steps. In the first step, a specific gNB requests that AMapM create a custom LMap for it based on the gNB's cell coverage area. However, AMapM will ignore this request if the request is received while the collection timer is active. In the second step, AMapM creates a custom LMap for the gNB. AMapM can copy all of GMap's data into LMap or only copy a portion of GMap's data into LMap. As an example, the AMapM may create LMap without the GMap overload statistics and accessibility control data. In the third step, AMapM then transmits the custom LMap to the appropriate gNB. In the fourth step, gNB stores the received LMap.

In FIG. 4, LMap update 425, is triggered by AMapM via signal 10405 and also by gNB via signal 10400. AMapM triggers an LMap update 425 when the GMap is updated. gNB triggers an LMap update 425 due to timer expiration. When gNB triggers an LMap update, gNB transmits the LMap update request to AMapM, and in response, AMapM generates and transmits a custom LMap to the appropriate gNB. When AMapM triggers a LMap update, AMapM generates and transmits a custom LMap to the appropriate gNB and the gNB transmits back an acknowledgement or a negative acknowledgement to AMapM.

In FIG. 4, UMap creation 430 is triggered by AMapM and by gNB via signal 10415. UE sends its request for UMap to either AMapM or gNB. In response, either AMapM or gNB create a custom UMap for the requesting UE according to the predicted mobility and capability information of the UE. The predicted UE mobility is the predicted location the UE may travel through. This predicted UE mobility is used by the AMapM to determine the shape and the boarder of the UMap as well as pre-configured handover defined in the UMap.

Generating a map based on the predicted mobility of the UE means that the map may contain only information related to locations along the predicated mobility (motion path or mobility track) of the UE. The locations may be on and/or near the predicated mobility track of the UE. The locations may be associated to information to be used by the UE, e.g. downlink synchronization parameters and UL transmission parameters.

In FIG. 4, UMap update 435, is triggered by AMapM via signal 10435 and by UE or gNB via signal 10440. UE triggers a UMap update when the UE's UMap update timer expires. Expiration of the UE UMap update timer results in UE requesting either AMapM or gNB update its UMap. However, AMapM and gNB can update UE's UMap without being triggered by UE. Steps 10425, 10405 and 10435 are used to illustrate that Map update can only happen after the Map (GMap/LMap/UMap) is created. In this disclosure, 'Map' and 'AMap' are synonymous and used interchangeably.

Figure 5:
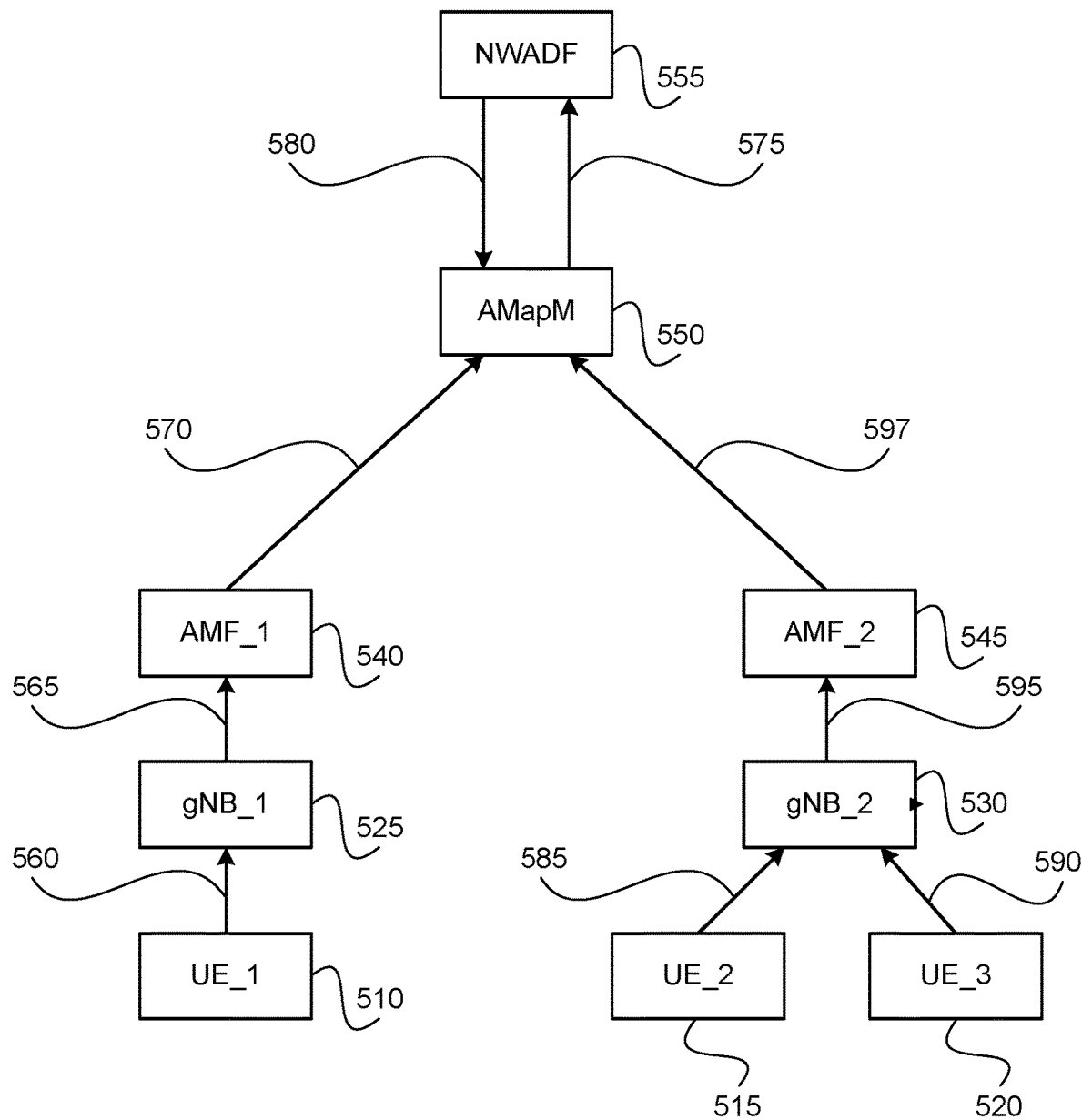
FIG. 5 illustrates the apparatus used to create a GMap, according to an embodiment of the present invention.

FIG. 5 illustrates creation of GMap based on AI analysis of downlink synchronization and uplink transmission parameters associated with UE location, according to an embodiment of the present invention. During RACH, UE_1 510 transmits its geographic location and the uplink synchronization and downlink synchronization parameters for gNB_1 525 to gNB_1 525 via connection 560. Uplink synchronization parameters may include parameters used for synchronizing the UE_1 510 and the gNB_1 525 for the UE_1 510's uplink transmission. gNB_1 525 collects the UE location and associated uplink synchronization and downlink synchronization parameters from UE_1 510. gNB_1 525 then organizes this information (including UE location, cell antenna information, and RACH related information) and generates UE connection statistics, e.g., Historical Connection Statistics, load statistics and etc. The gNB_1 525 then transmits the organized information and statistics to AMF_1 540 via connection 565. AMF_1 540 add mobility prediction information and overload statistics to the information received from gNB_1 525 and sends all of this information to AMapM 550 via connection 570. AMapM 550 creates GMap using the information received from AMF_1 540 and AMF_2 545 and transmits it to NWDAF 555 via signal 575. NWDAF 555 analyzes the GMap information using AI and optimizes the GMap data. This optimization process constantly refines the GMap data as the AMapM continues to receive data from AMF_1 540 and AMF_2 545. When the collection timer expires, GMap is stored in the AMapM.

FIG. 5 also illustrates the situation where a plurality of UEs are connected to a gNB. During RACH, both UE_2 515 and UE_3 520 transmit their geographic location and related uplink synchronization and downlink synchronization parameters for gNB_2 530 to gNB_2 530 via connections 585 and 590 respectively. Uplink synchronization parameters are parameters used for synchronizing the UE_2 515 and UE_3 520 and the gNB_1 530 for the UEs' (UE_2 515 and UE_3 520) uplink transmission. gNB_2 530 collects the UE location and associated uplink synchronization and downlink synchronization parameters from both UE_2 515 and UE_3 520. gNB_2 530 then organizes this information (including both UE_2's 515 and UE_3's 520 location, cell antenna information, and RACH related information) and generates UE connection statistics, e.g., Historical Connection Statistics, load statistics and etc., for both UE_2 515 and UE_3 520. The gNB_2 530 then transmits the organized information and statistics to AMF_2 545 via connection 595. AMF_2 545 adds mobility prediction information for UE_2 515 and UE_3 520 as well as overload statistics to the information received from gNB_2 530 and sends all of this information to AMapM 550 via connection 597.

Figure 6:
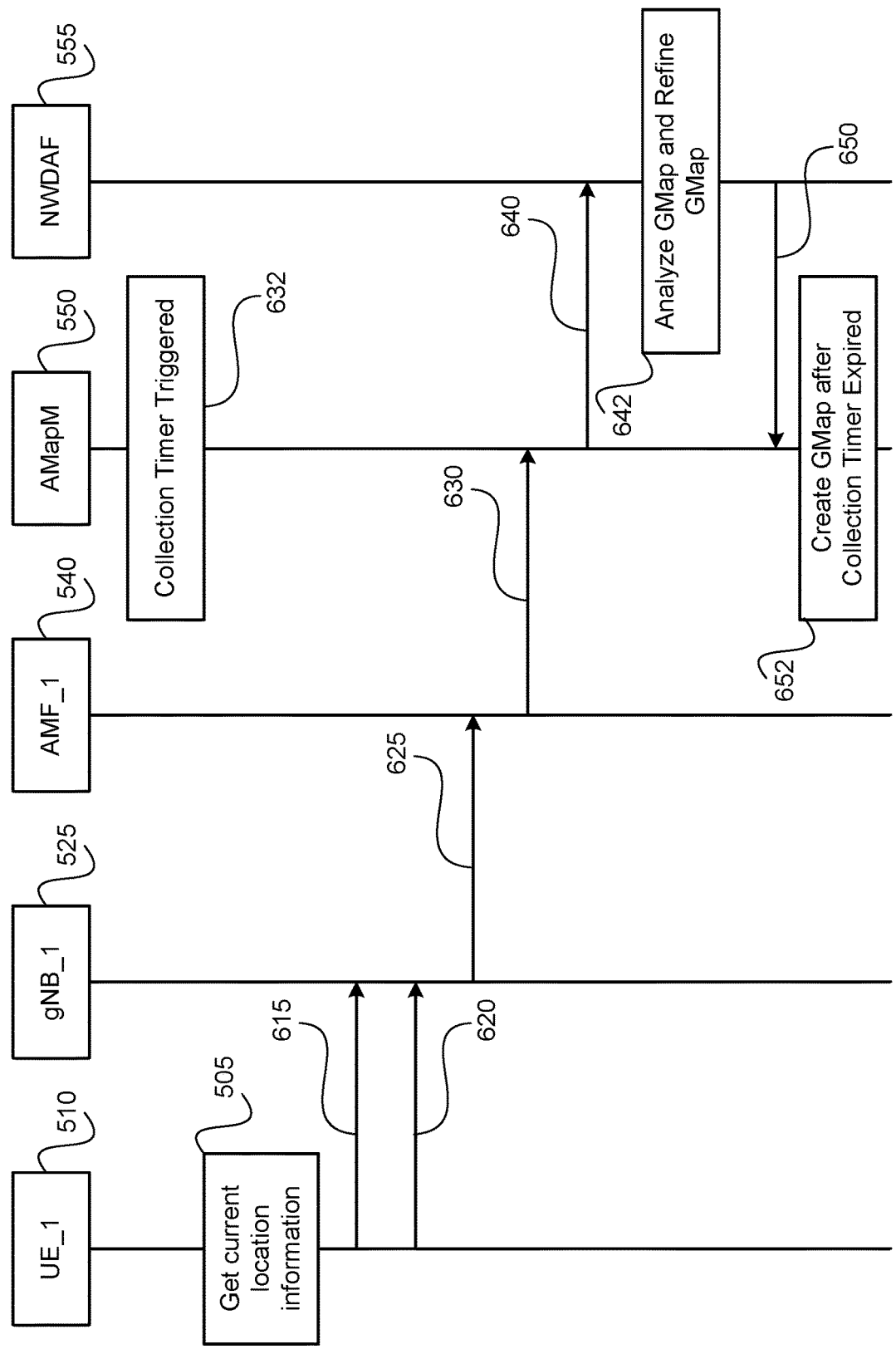
FIG. 6 illustrates the call flow diagram for GMap creation, according to an embodiment of the present invention.

FIG. 6 illustrates the call flow diagram for GMap creation, according to an embodiment of the present invention. The GMap creation process begins by collecting the geographic location information of the UEs connected to the gNBs in the network using Get current location information 505. During this process, UE_1 510 signals a RRC Connection Request 615 to gNB_1 525. UE_1 510 also sends gNB_1 525 UE_1 510's geographic location via signal 620. gNB_1 525 then transmits the locations of all UEs connected to gNB_1 525 as well as statistics to AMF_1 540 via signal 625. AMF_1 540 then sends the UE locations, statistics, and predicted UE mobility to AMapM 550 via signal 630. AMapM 550 then starts the process Collection Timer Triggered 632. AMapM 550 then populates the fields of the GMap with the received data from AMF_1 540 and also starts the collection timer. AMapM 550 then transmits the collected GMap data to NWDAF 555 via signal 640. NWDAF 555 and analyzes the GMap data and refines the GMap using Analyze GMap and Refine GMap 624. NWDAF 555 then sends AMapM 550 the Created GMap after Collection Timer Expired 652 via signal 650. The process of NWDAF 555 sending AMapM 550 a refined GMap continues until the collection timer expires. AMapM 550 has an optimized GMap when the collection timer expires.

Figure 7:
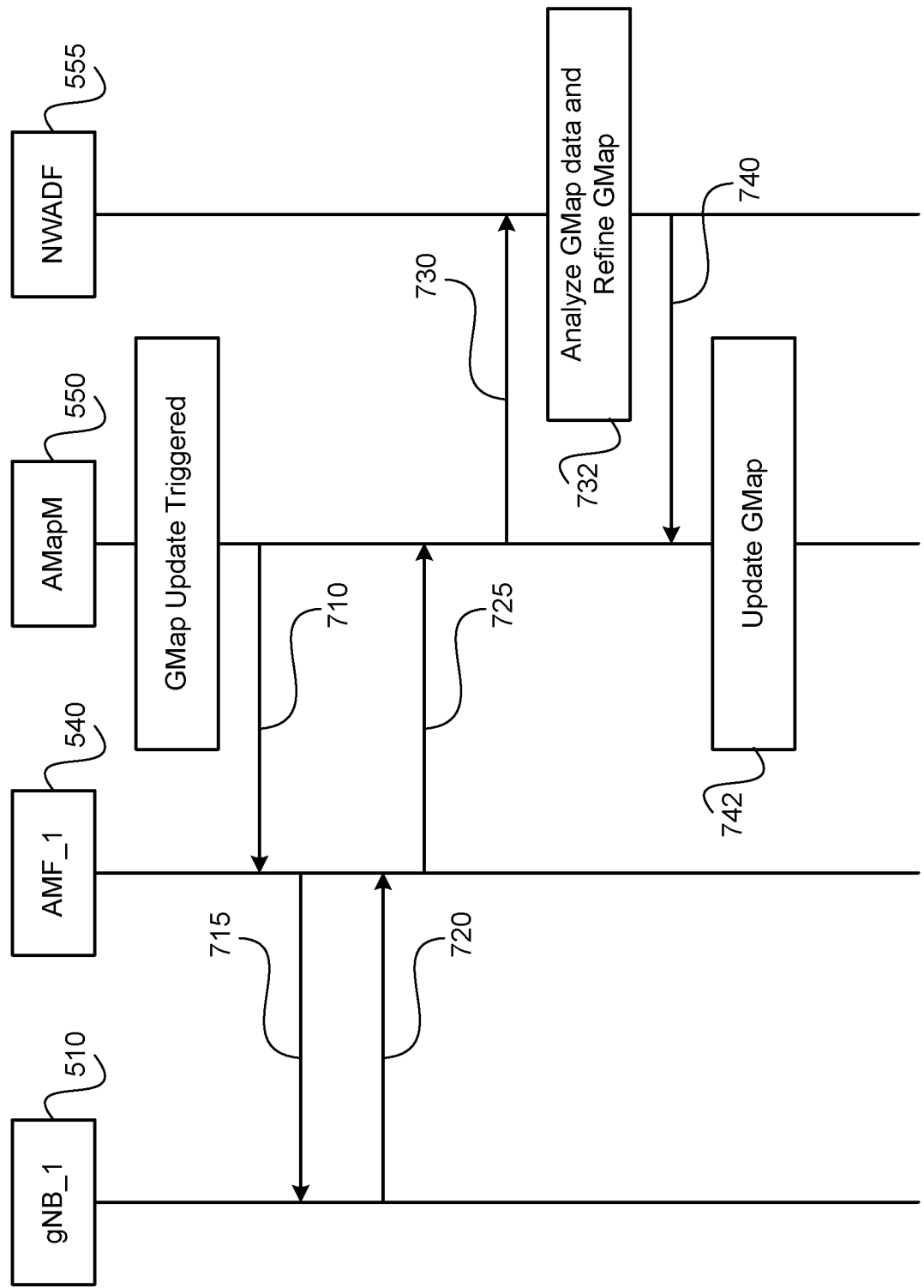
FIG. 7 illustrates the call flow diagram for updating the contents of a GMap, according to an embodiment of the present invention.

FIG. 7 illustrates the call flow diagram for updating the contents of a GMap, according to an embodiment of the present invention. AMapM 550 is triggered to update GMap by the expiration of a timer or modification of network topology. AMapM 550 transmits a request for gNB_1 510 to update its stored GMap by signalling AMF_1 540 via signal 710. AMF_1 540 then requests gNB_1 510 to update its stored GMap by signalling gNB_1 510 via signal 715. gNB_1 510 responds to AMF_1 540 by transmitting the collected data back to AMF_1 540 via signal 720. AMF_1 540 then responds to AMapM 550 by transmitting gNB_1 510's collected data to AMapM 550 via signal 725. AMapM 550 updates its stored GMap and transmits it to NWDAF 555 via signal 730. NWDAF 555 then analyzes and refines the received GMap using Analyze GMap data and Refine GMap 732 and then transmits the refined GMap to AMapM 550. AMapM 550 then updates the contents of its stored GMap with the data from the received GMap using Update GMap 742.

Figure 8:
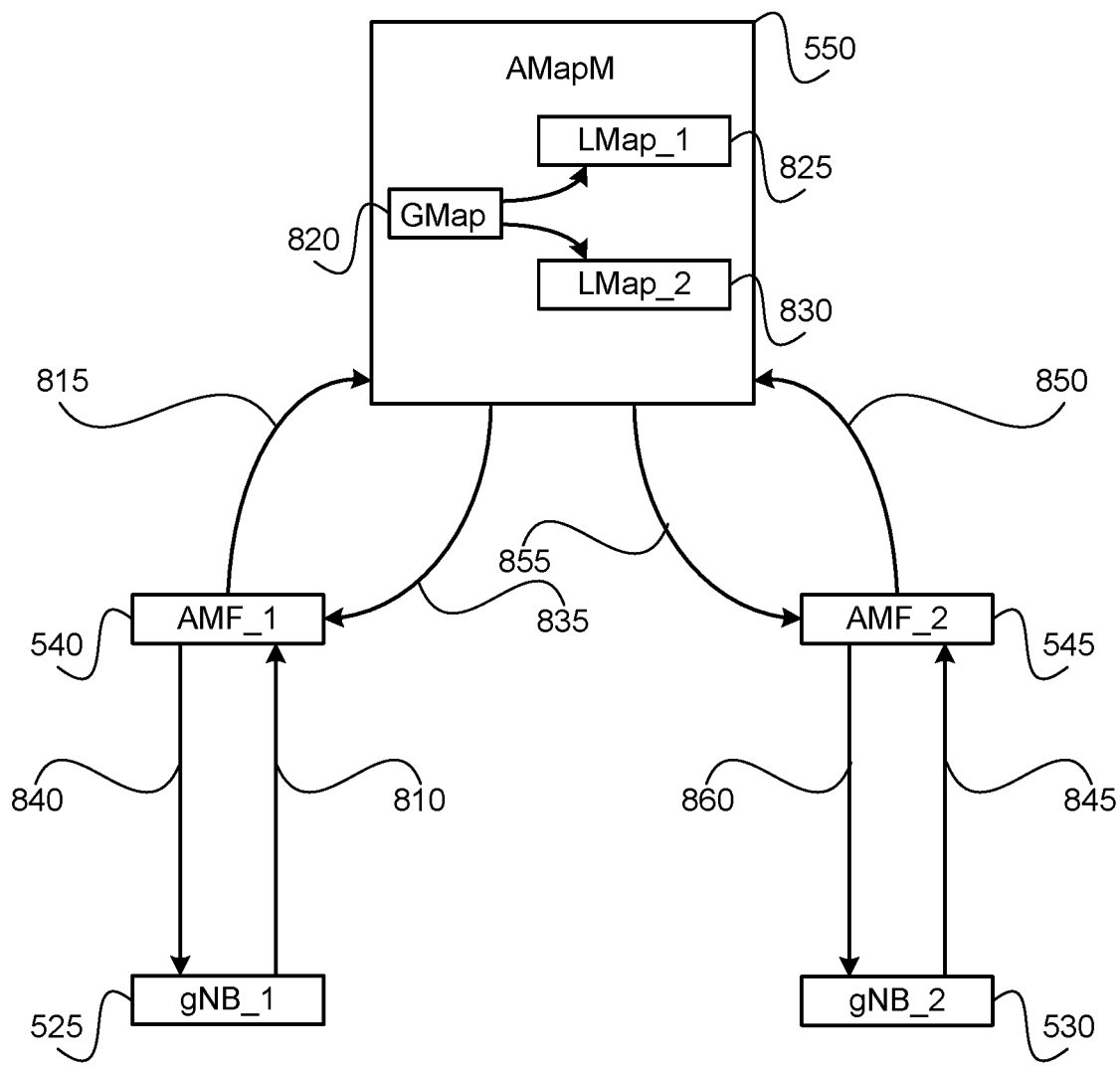
FIG. 8 illustrates the apparatus used to create an LMap, according to an embodiment of the present invention.

FIG. 8 illustrates the apparatus used to create a LMap, according to an embodiment of the present invention. gNB_1 525 requests LMap creation by transmitting a request to AMF_1 540 via signal 810. AMF_1 540 then transmits a request for gNB_1 525's LMap request to AMapM 550 via signal 815. In response, AMapM 550 generates an LMap_1 825 from its stored GMap 820 and transmits LMap_1 825 to AMF_1 540 via signal 835. AMF_1 540 then transmits LMap_1 825 to gNB_1 525 via signal 840. gNB_2 530 requests LMap generation by transmitting a request to AMF_2 545 via signal 845. AMF_2 545 then transmits a request for gNB_2 530's LMap generation request to AMapM 550 via signal 850. In response, AMapM 550 generates an LMap_2 830 from its stored GMap 820 and transmits LMap_2 830 to AMF_2 545 via signal 855. AMF_2 545 then transmits LMap_2 830 to gNB_2 530 via signal 860.

Figure 9:
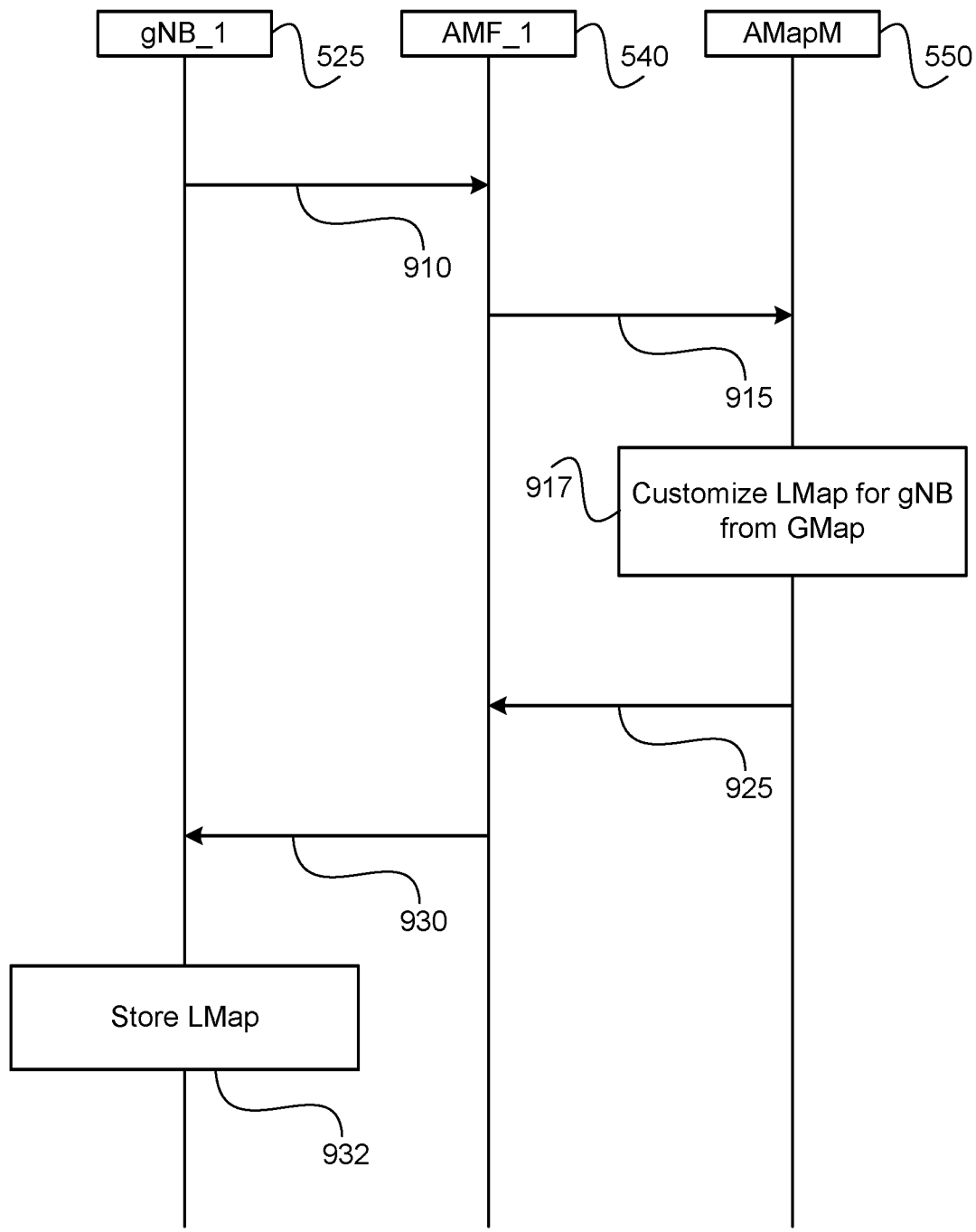
FIG. 9 illustrates the call flow diagram for LMap creation, according to an embodiment of the present invention.

FIG. 9 illustrates the call flow diagram for LMap creation, according to an embodiment of the present invention. gNB_1 525 requests LMap creation by signalling AMF_1 540 via signal 910. AMF_1 540 then transmits gNB_1 525's LMap request to AMapM 550 via signal 915. AMapM 550 in response creates a custom LMap for gNB_1 525 from its stored GMap using Customize LMap for gNB from GMap 917. AMapM 550 transmits gNB_1 525's custom LMap to AMF_1 540 via signal 925. AMF_1 540 then transmits gNB_1 525's LMap to gNB_1 525 via signal 930. gNB_1 525 stores the received LMap using Stored LMap 932.

Figure 10:
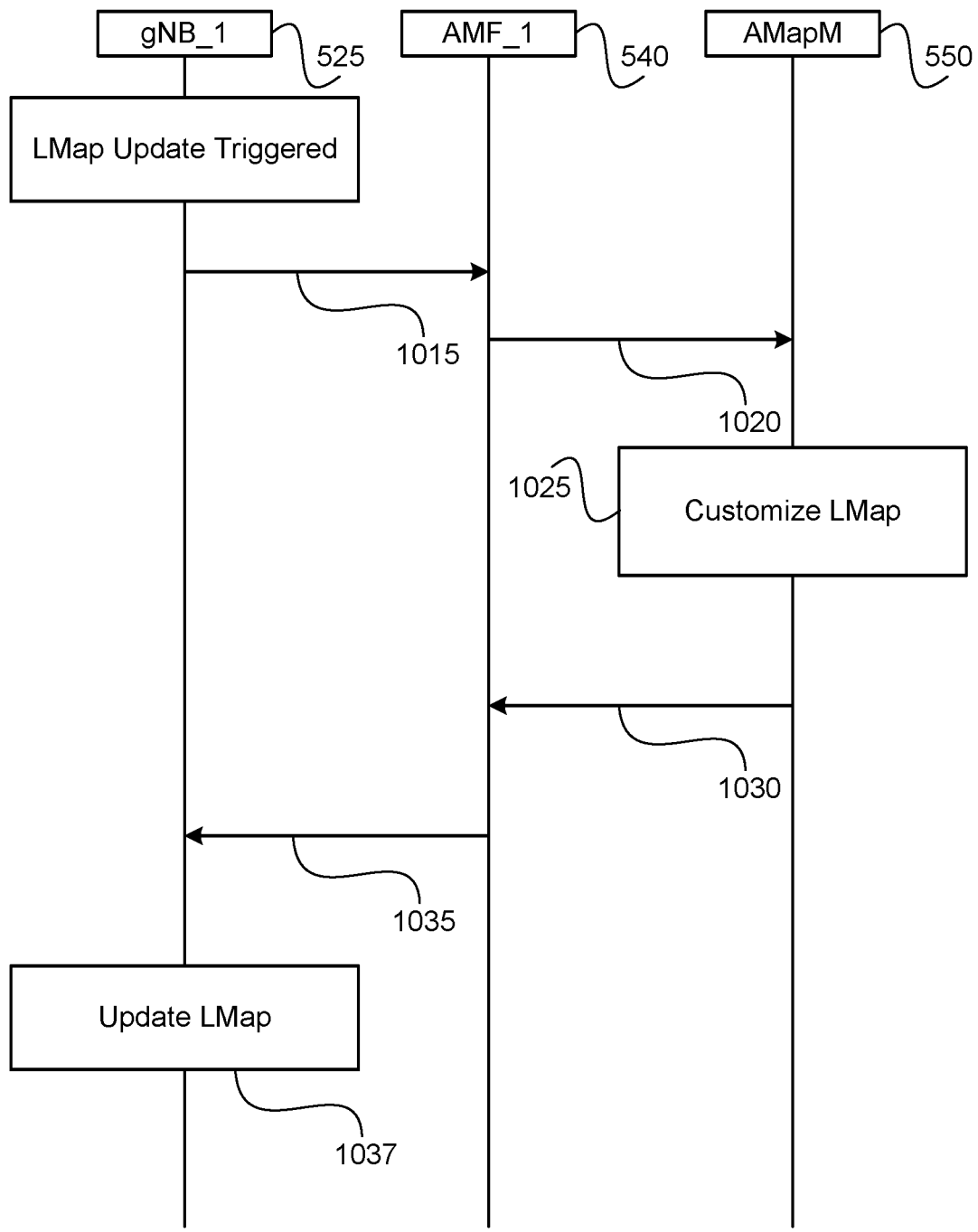
FIG. 10 illustrates the call flow diagram for updating the contents of an LMap triggered by a gNB, according to an embodiment of the present invention.

FIG. 10 illustrates the call flow diagram for updating the contents of a LMap triggered by a gNB, according to an embodiment of the present invention. gNB_1 525's LMap update is triggered (e.g., by LMap expiration timer). gNB_1 525 requests an LMap update by transmitting its request to AMF_1 540 via signal 1015. AMF_1 540 then transmits gNB_1 525's LMap update request to AMapM 550 via signal 1020. In response, AMapM 550 creates a custom LMap for gNB_1 525, using Customize LMap 1025, and transmits this custom LMap to AMF_1 540 via signal 1030. AMF_1 540 then transmits gNB_1 525's custom LMap to gNB_1 252 via signal 1035. gNB_1 525 then stores the updated LMap using Update LMap 1037.

Figure 11:
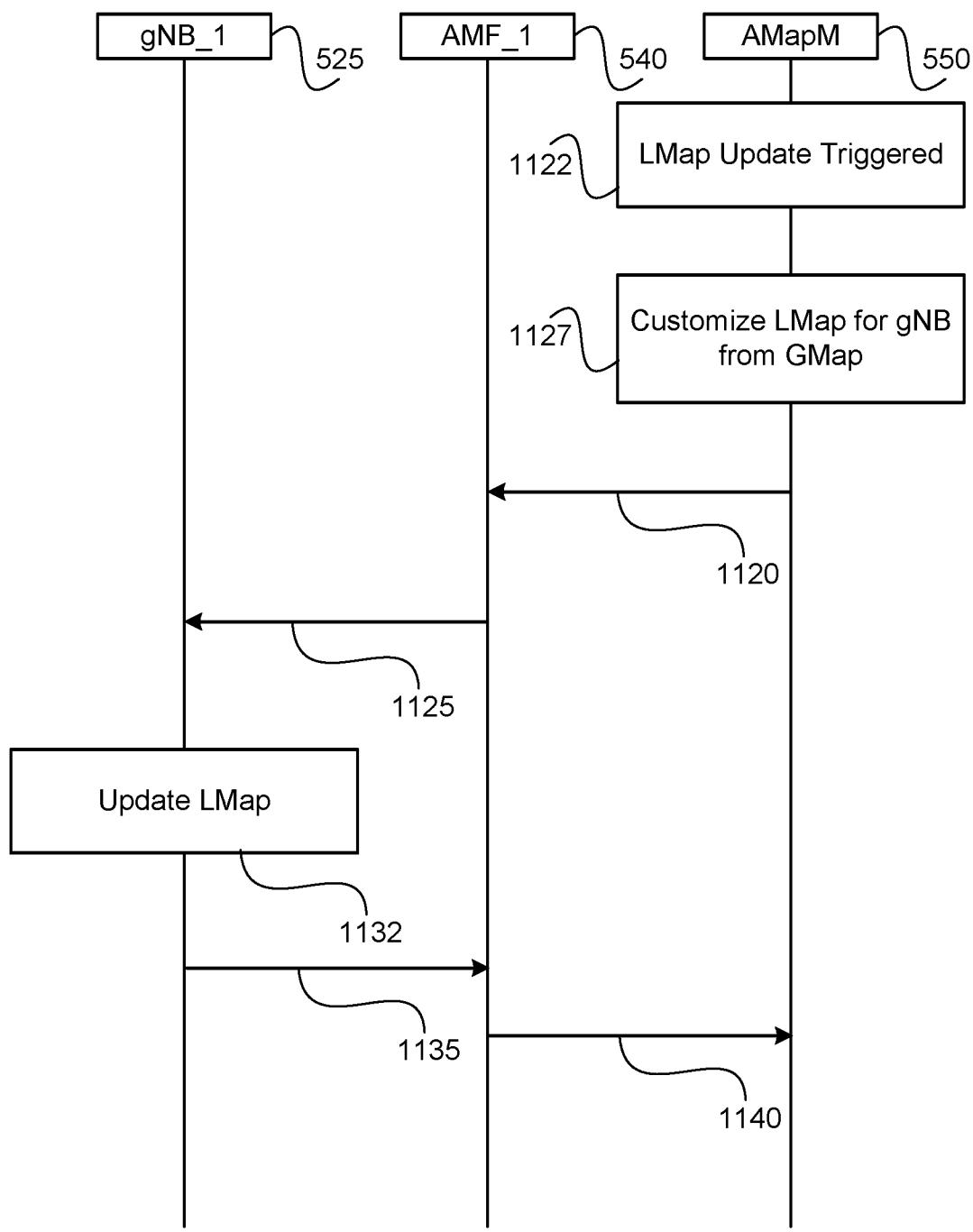
FIG. 11 illustrates the call flow diagram for updating the contents of an LMap triggered by AMapM, according to embodiments of the present invention.

FIG. 11 illustrates the call flow diagram for updating the contents of a LMap triggered by a AMapM, according to embodiments of the present invention. AMapM 550's LMap update is triggered e.g., by modification of GMap, via LMap Update Triggered 1122, and in response, AMapM 550 creates a custom LMap for gNB_1 525 using data from its stored GMap via Customize LMap for gNB from GMap

1127. AMapM 550 then transmits gNB_1 525's custom LMap to AMF_1 540 via signal 1120. AMF_1 540 then transmits gNB_1 525's LMap to gNB_1 525 via signal 1125. In response, gNB_1 525 updates 1132 the contents of its stored LMap with the data from the received LMap and transmits an LMap update acknowledgement to AMF_1 540 via signal 1135. AMF_1 540 then transmits gNB_1 525's LMap update acknowledgement to AMapM 550 via signal 1140.

Figure 12:
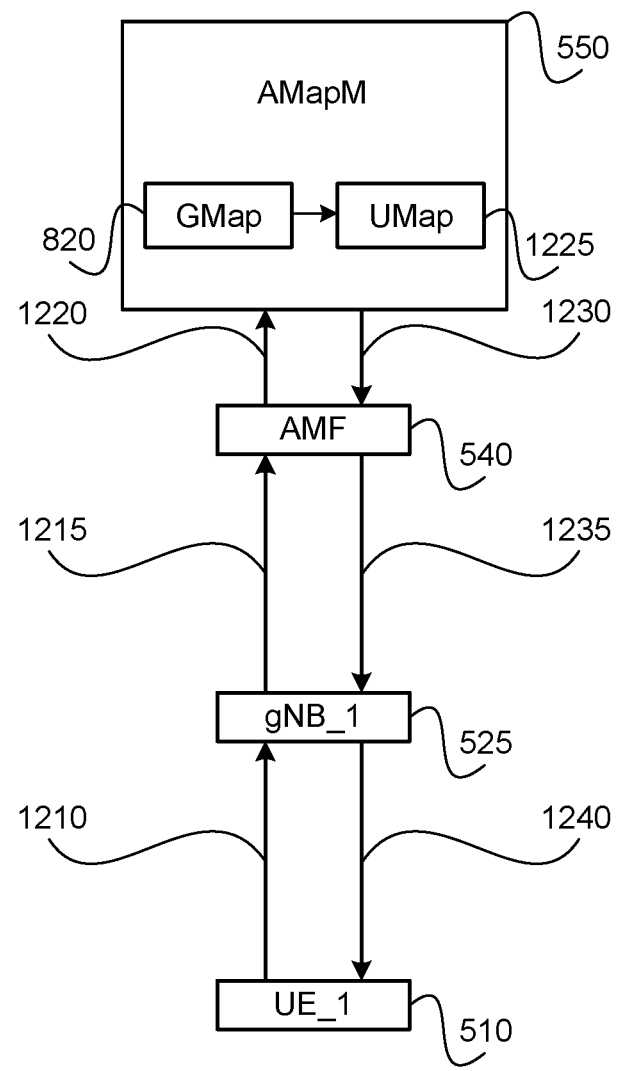
FIG. 12 illustrates the apparatus used for UMap creation by AMapM, according to embodiments of the present invention.

FIG. 12 illustrates the apparatus used for UMap creation by AMapM, according to embodiments of the present invention. UE_1 510 transmits a UMap request to gNB_1 525 via signal 1210. In response, gNB_1 525 transmits UE_1 1210's UMap request to AMF_1 540 via signal 1215. AMF_1 540 then transmits UE_1 1210's UMap request to AMapM 550 via signal 1220. AMapM 550 then creates UMap 1225 from the data in it stored GMap 820. AMapM 550 then transmits UE-1 510's UMap to AMF_1 540 via signal 1230. AMF_1 540 then transmits UE_1 510's UMap to gNB_1 525 via signal 1235. gNB_1 525 then transmits UE_1 510's UMap to UE_1 510 via signal 1240.

Figure 13:
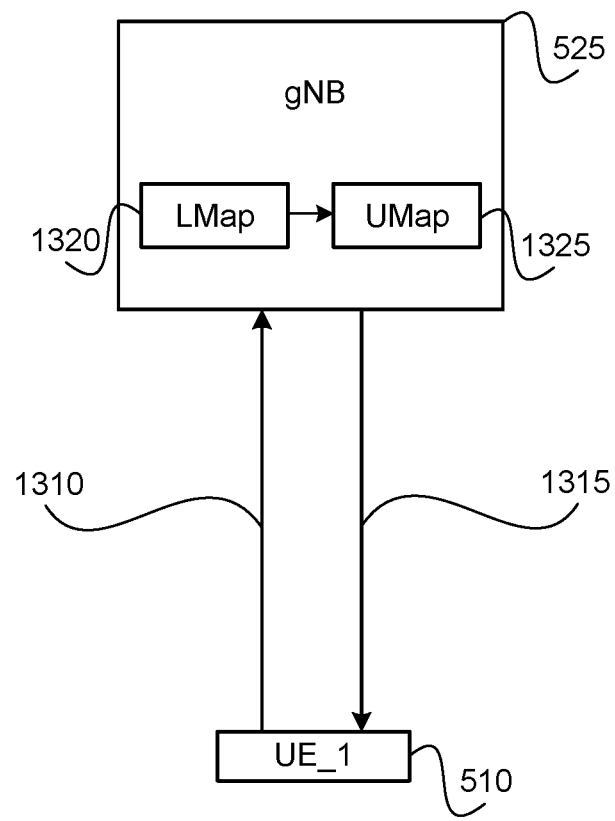
FIG. 13 illustrates the apparatus used for UMap creation by gNB, according to an embodiment of the present invention.

FIG. 13 illustrates the apparatus used for UMap creation by gNB, according to an embodiment of the present invention. UE_1 510 transmits its UMap request to gNB_1 525 via signal 1310. gNB 525 then creates a custom UMap 1325 for UE_1 using the data from its stored LMap 1320. gNB_1 525 then transmits UE_1 510's UMap to UE_1 510 via signal 1315.

It should be noted that the map generation by AMapM and/or gNB may be based on inputs from multiple UE(s), and likewise, map distribution/transmission, for example, 1240, 1315, may be to a plurality of UE(s). Accordingly, in embodiments discussed in this disclosure, the number of UE(s) from which map information is collected may be greater than, less than, or equal to the number of UE(s) for and to which a map is generated and transmitted. In other words, there does not need to be a 1:1 correspondence of the number of UE from which the map info is collected and the number of UE to which the map is transmitted.

Figure 14:
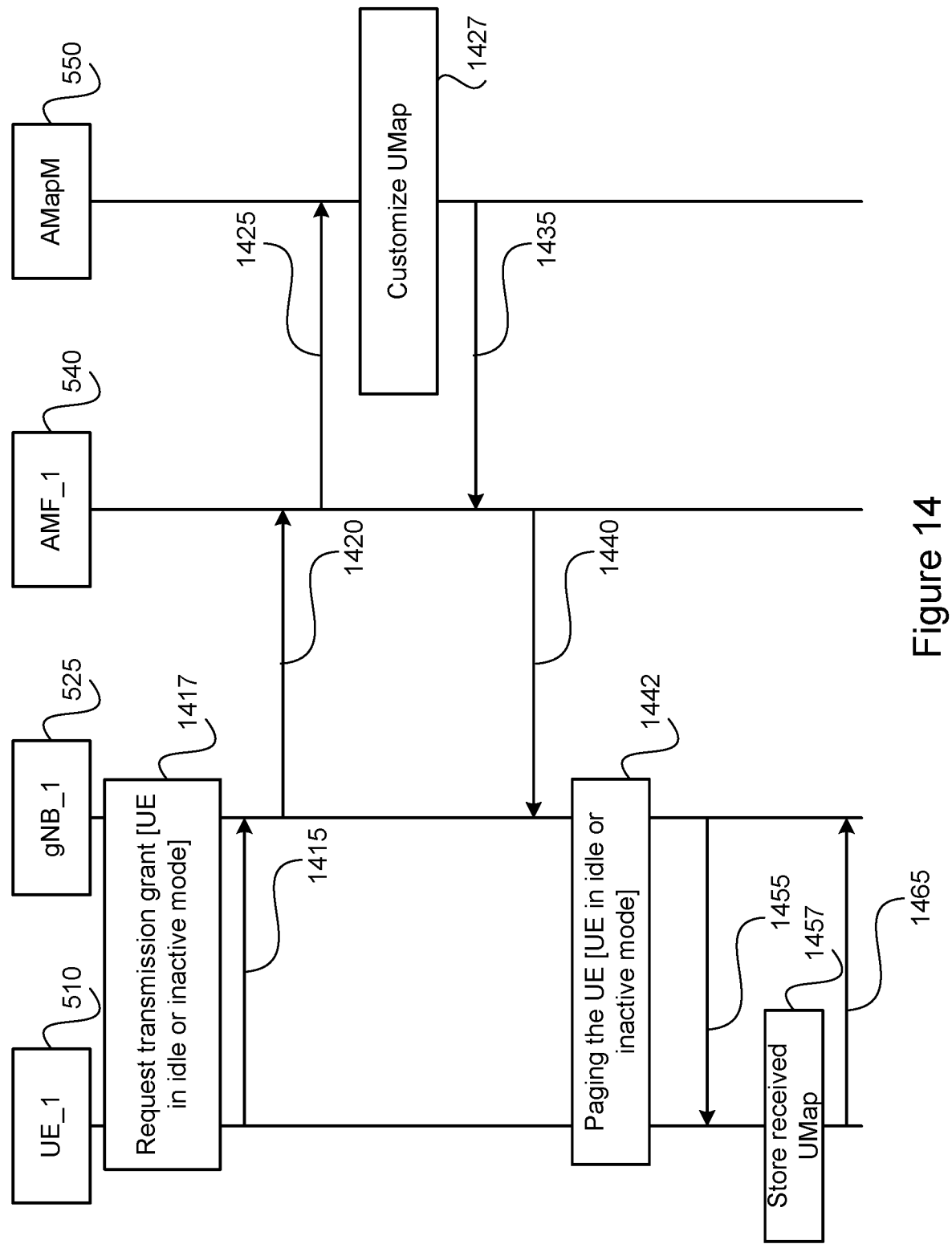
FIG. 14 illustrates a call flow diagram for UMap creation by AMapM, according to embodiments of the present invention.

FIG. 14 illustrates a call flow diagram for UMap creation by AMapM, according to embodiments of the present invention. UE_1 510 requests a transmission grant when the UE is in either idle or inactive mode, via Request transmission grant [UE in idle or inactive mode] 1417, from gNB_1 525 via signal 1415. gNB_1 525 transmits UE_1 510's UMap request to AMF_1 540 via signal 1420. AMF_1 540 then transmits UE_1 510's UMap request to AMapM 550 via signal 1425. In response, AMapM 550 creates a custom UMap for UE_1 510, via Custom UMap 1427, and transmits it to AMF_1 540 via signal 1435. In some embodiments, the AMapM creates a custom UMap for each UE according to each UE's service demand. In some embodiments which utilize network slicing, the AMapM customizes UMap according to the matched network slice used by the UE. AMF_1 540 then transmits UE_1 510's UMap to gNB_1 525 via signal 1440. UE_1 510 is then paged when in either idle or inactive modes by gNB_1 525, via Paging the UE [UE in idle or inactive mode] 1442, transmitting UE_1 510's UMap to UE_1 510 via signal 1455. In response, UE_1 510 stores the received UMap via Store received UMap 1457.

Figure 15:
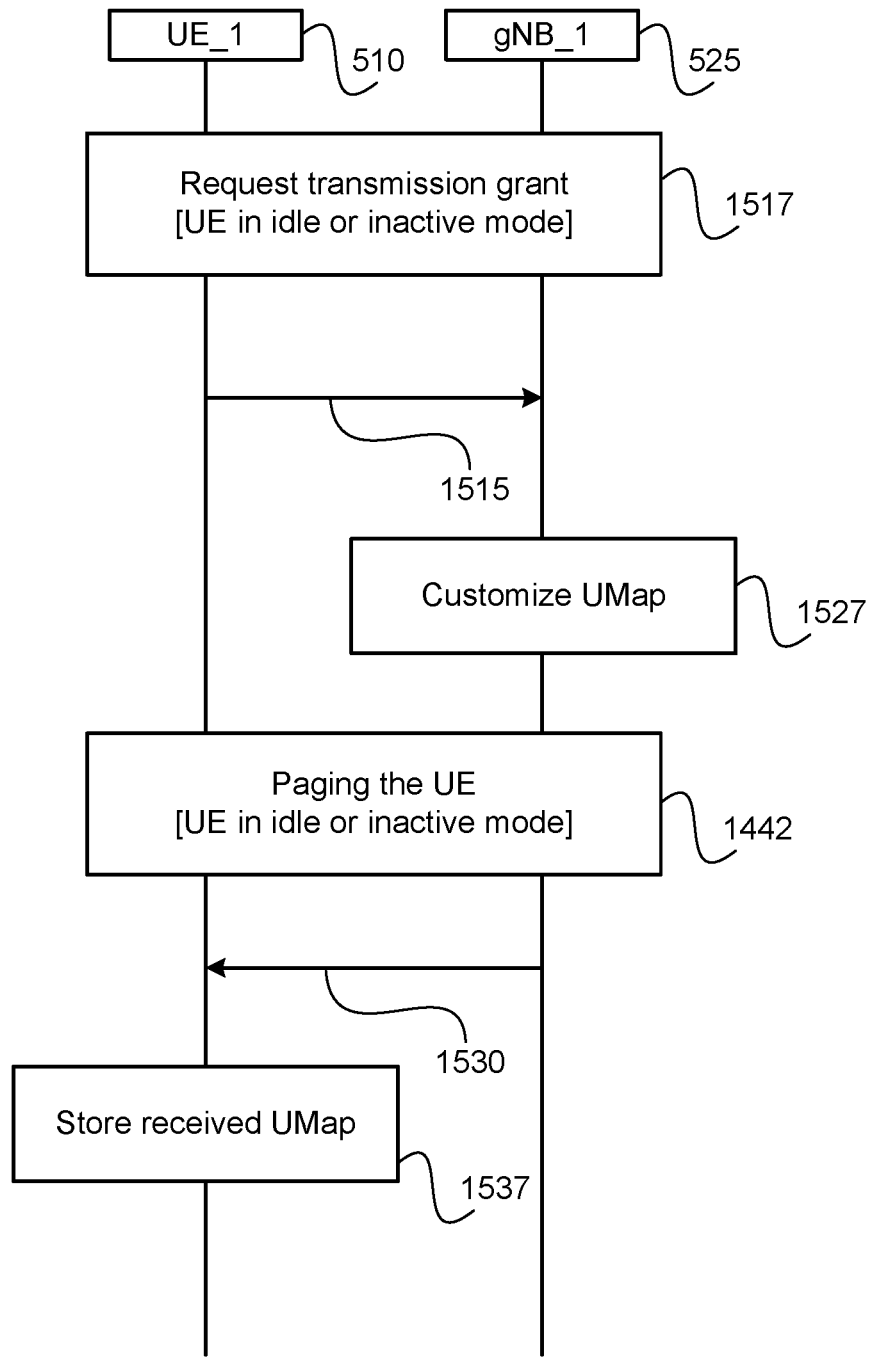
FIG. 15 illustrates a call flow diagram for UMap creation by gNB, according to embodiments of the present invention.

FIG. 15 illustrates a call flow diagram for UMap creation by gNB, according to embodiments of the present invention. UE_1 510 requests a transmission grant, via Request transmission grant [UE in idle or inactive mode] 1517, when UE_1 510 is in either idle or inactive modes by signalling gNB_1 525 via signal 1515. In response, gNB_1 525 creates a custom UMap for that particular UE via Customize UMap 1527. gNB_1 525 then pages 1442 the UE when the UE is in either idle or inactive modes and transmits the UE_1 510 UMap to UE_1 510 via signal 1530. UE_1 510 then stores 1537 the received UMap.

Figure 16:
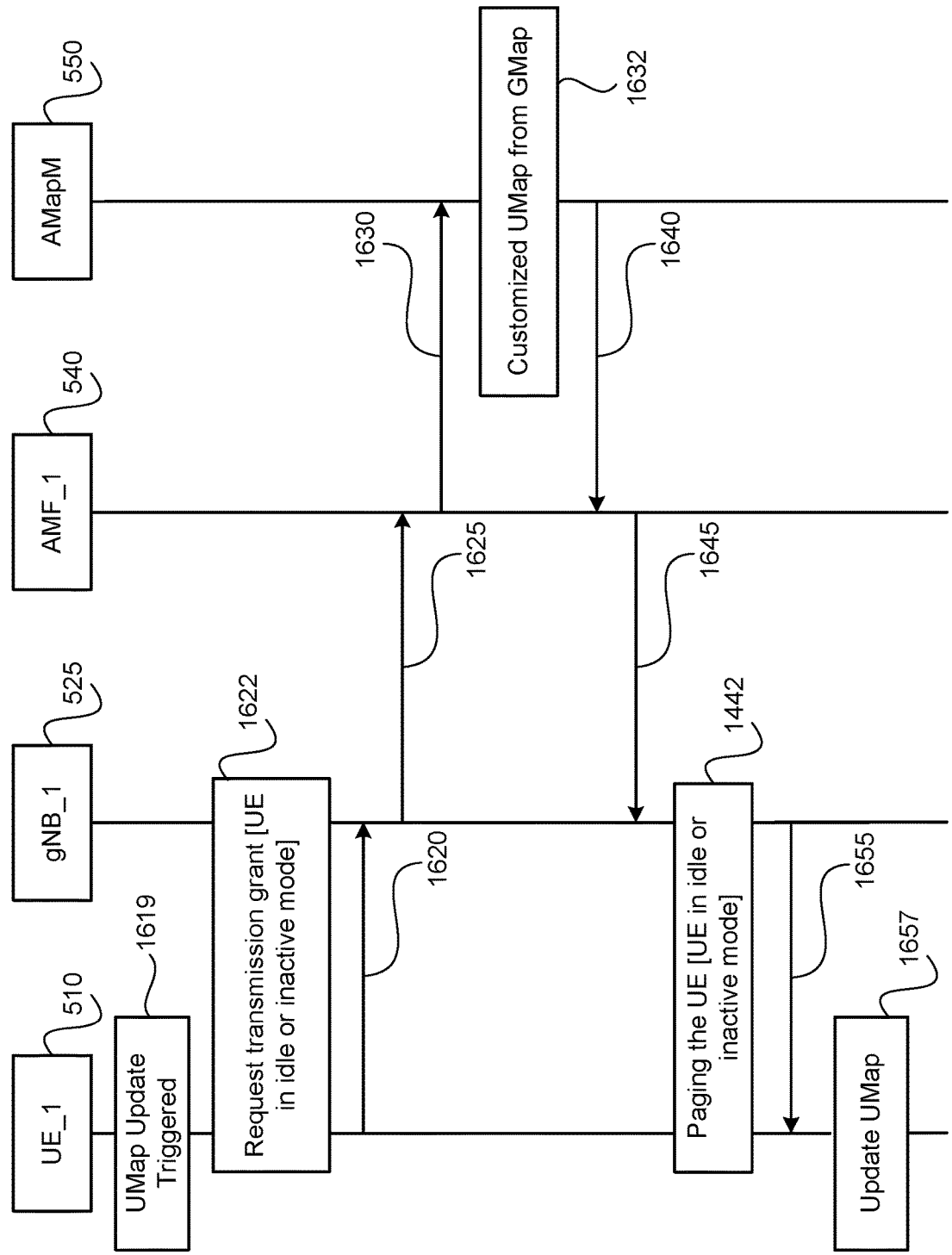
FIG. 16 illustrates a call flow diagram for UE triggered UMap update by AMapM, according to embodiments of the present invention.

FIG. 16 illustrates a call flow diagram for UE triggered UMap update by AMapM, according to embodiments of the present invention. UE_1 510 begins the process of requesting a UMap update when UE_1 510's UMap update is triggered 1619 (for example when UE_1 510's UMap update timer expires). UE_1 510 requests a transmission grant from gNB_1 525, when UE_1 510 is either in idle or inactive mode, via signal 1620. gNB_1 525 then transmits UE_1 510's UMap update request to AMF_1 540 via signal 1625. AMF_1 540 then transmits UE_1 510's UMap update request to AMapM via signal 1630. In response, AMapM creates a customized UMap for UE_1 510 using data from its stored GMap. AMapM 550 then transmits UE_1 510's updated UMap to AMF_1 540 via signal 1640. AMF_1 540 then transmits UE_1 510's updated UMap to gNB_1 525 via signal 1645. gNB_1 525 then pages UE_1 510 when UE_1 510 is in either idle or inactive mode and transmits UE_1 510's updated UMap to UE 510 via signal 1655. UE_1 510 then updates its stored UMap based on the received UMap.

Figure 17:
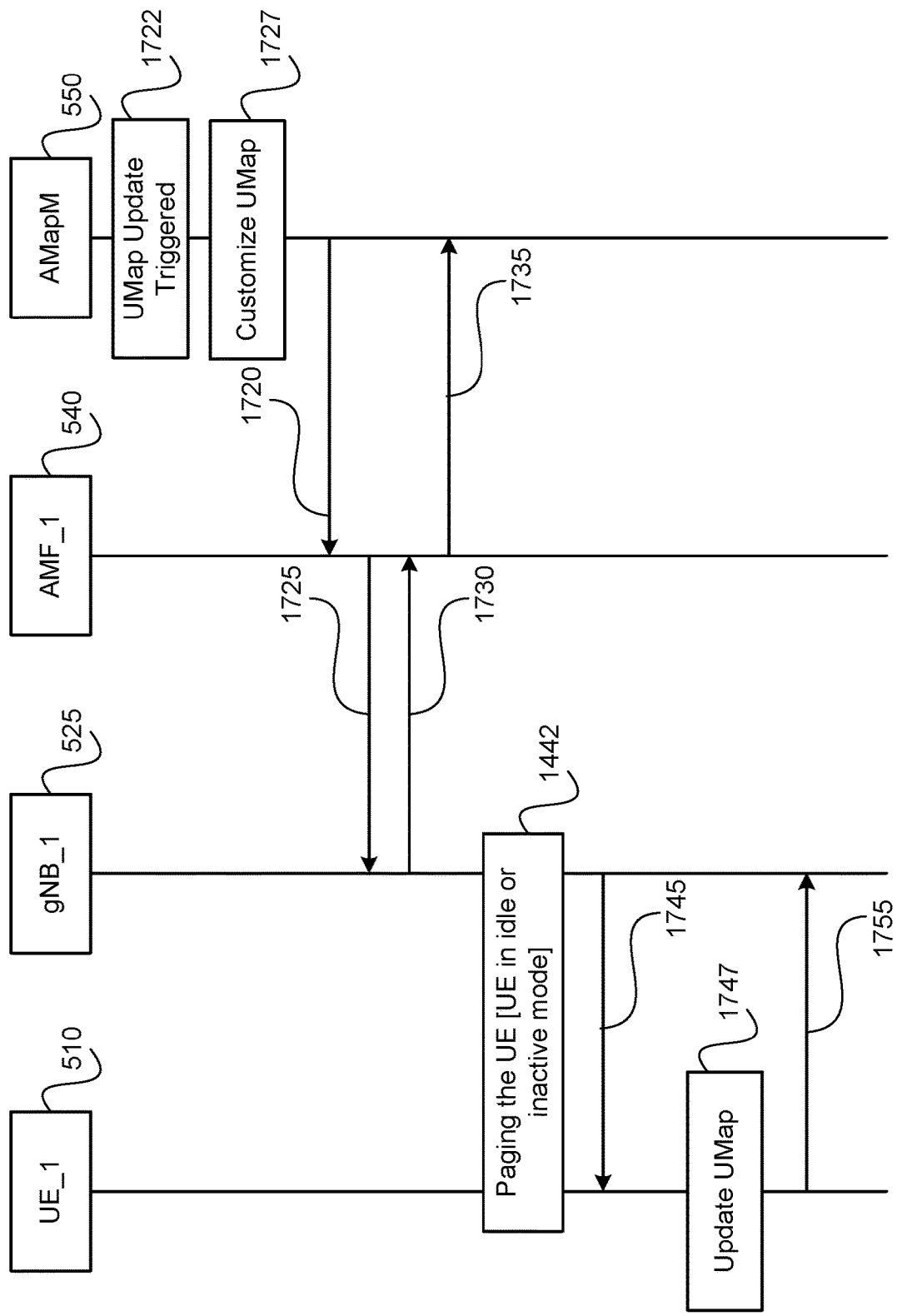
FIG. 17 illustrates a call flow diagram for AMapM triggered UMap update by AMapM, according to embodiments of the present invention.

FIG. 17 illustrates a call flow diagram for AMapM triggered UMap update by AMapM, according to embodiments of the present invention. AMapM 550 generates an updated UMap for UE_1 510 when triggered and transmits UE_1 510's updated UMap to AMF_1 540 via signal 1720. UMap update is triggered by AMapM, via UMap Update Triggered 1722, (For example, GMap is updated). AMF_1 540 then transmits UE_1 510's updated UMap to gNB_1 525 via signal 1725. gNB_1 525 also pages UE_1 510, via Paging the UE [UE in idle or inactive mode] 1442, when UE_1 510 is either in idle or inactive mode and transmits UE_1 510's updated UMap to UE_1 510 via signal 1745. UE_1 510 updates the contents of its stored UMap, via Update UMap 1747, with the data from the received UMap and also transmits a UMap update acknowledgment to gNB_1 525 via signal 1755. In response, gNB_1 525 transmits the UMap update acknowledgement to AMF_1 540 via signal 1730 and AMF_1 540 transmits the UMap update acknowledgement to AMapM 560 via signal 1735. In some embodiments, the responses 1730 and 1735 may occur after the 1755 response.

Figure 18:
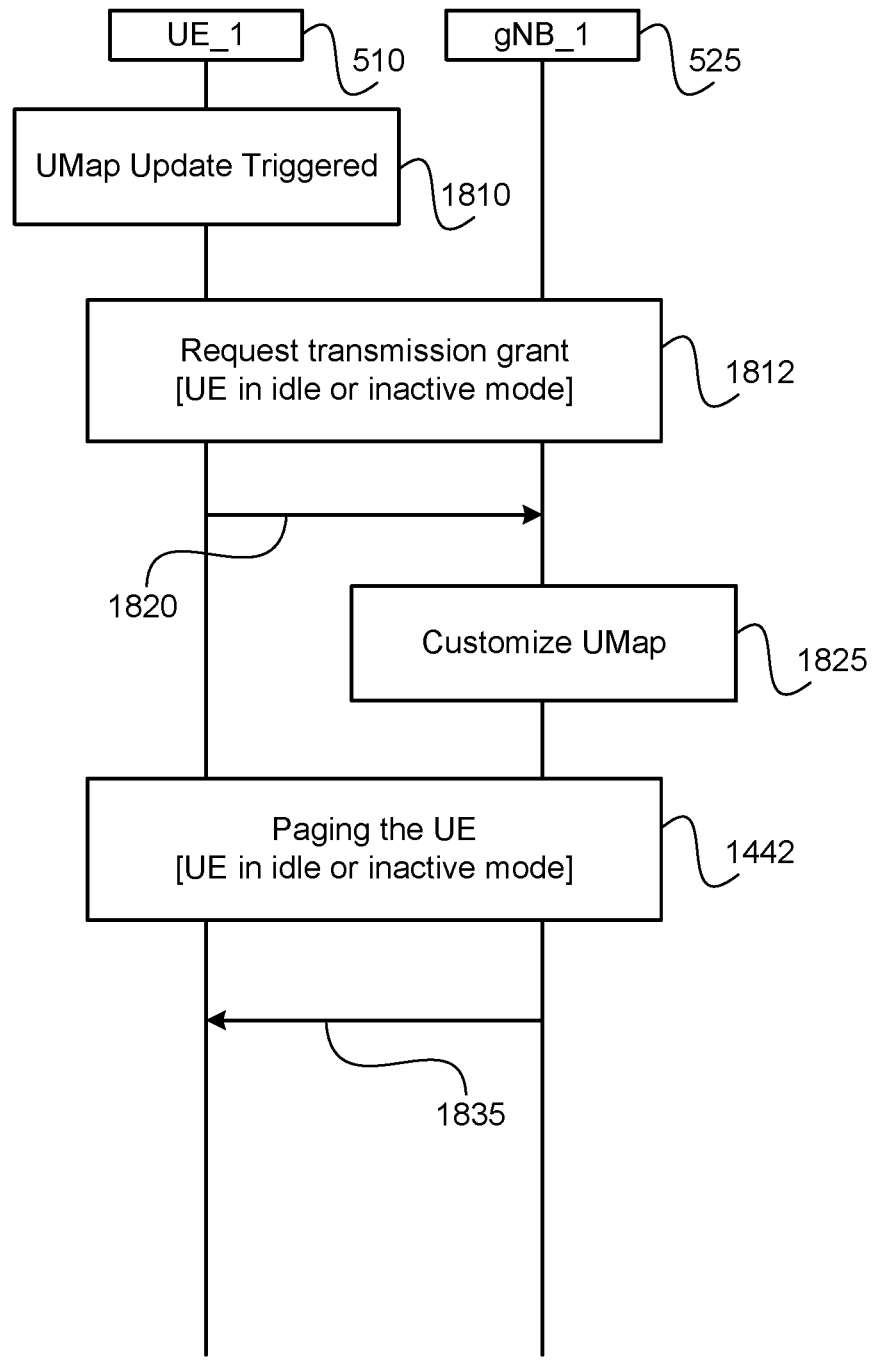
FIG. 18 illustrates a call flow diagram for UE triggered UMap update by gNB, according to embodiments of the present invention.

FIG. 18 illustrates a call flow diagram for UE triggered UMap update by gNB, according to embodiments of the present invention. UE_1 510 requests an updated UMap from gNB_1 525 when triggered by LMap update. UE_1 510 requests a transmission grant from gNB_1 525 when UE_1 510 is either in idle or inactive mode via signal 1820. In response, gNB_1 525 creates 1825 a customized UMap for UE_1 510. gNB_1 525 then pages 1442 UE_1 510 when UE_1 510 is either in idle or inactive mode and transmits UE_1 510's updated UMap to UE_1 510 via signal 1835.

Figure 19:
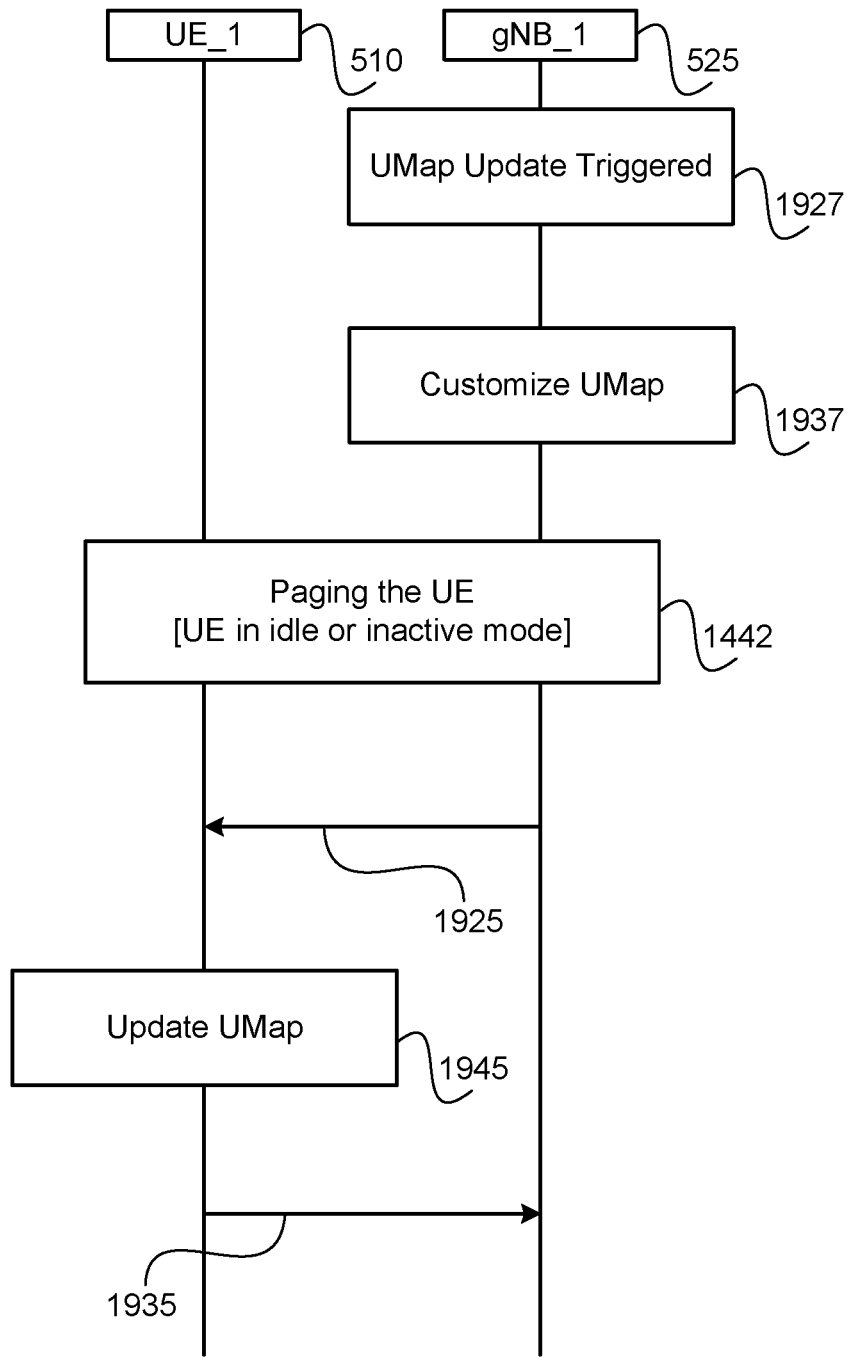
FIG. 19 illustrates a call flow diagram for gNB triggered UMap update by gNB, according to embodiments of the present invention.

FIG. 19 illustrates a call flow diagram for gNB triggered UMap update by gNB, according to embodiments of the present invention. gNB_1 525 creates 1937 an updated UMap for UE_1 510 when UMap update is triggered 1927 (For example, LMap is updated). gNB_1 525 pages 1442 UE_1 510 when UE_1 510 is either in idle or inactive mode and transmits the updated UE_1 510 UMap to UE_1 510 via signal 1925. UE_1 510 updates the contents of its stored UMap with the data from the received UMap and also transmits a UMap update acknowledge to gNB_1 525 via signal 1935.

In embodiments where the UE is not equipped with position estimation nor position detection devices, for example a Global Positioning System (GPS) receiver, the UE can utilize Location Management Function (LMF) 140, as shown in FIG. 29, to determine its position.

Figure 20:
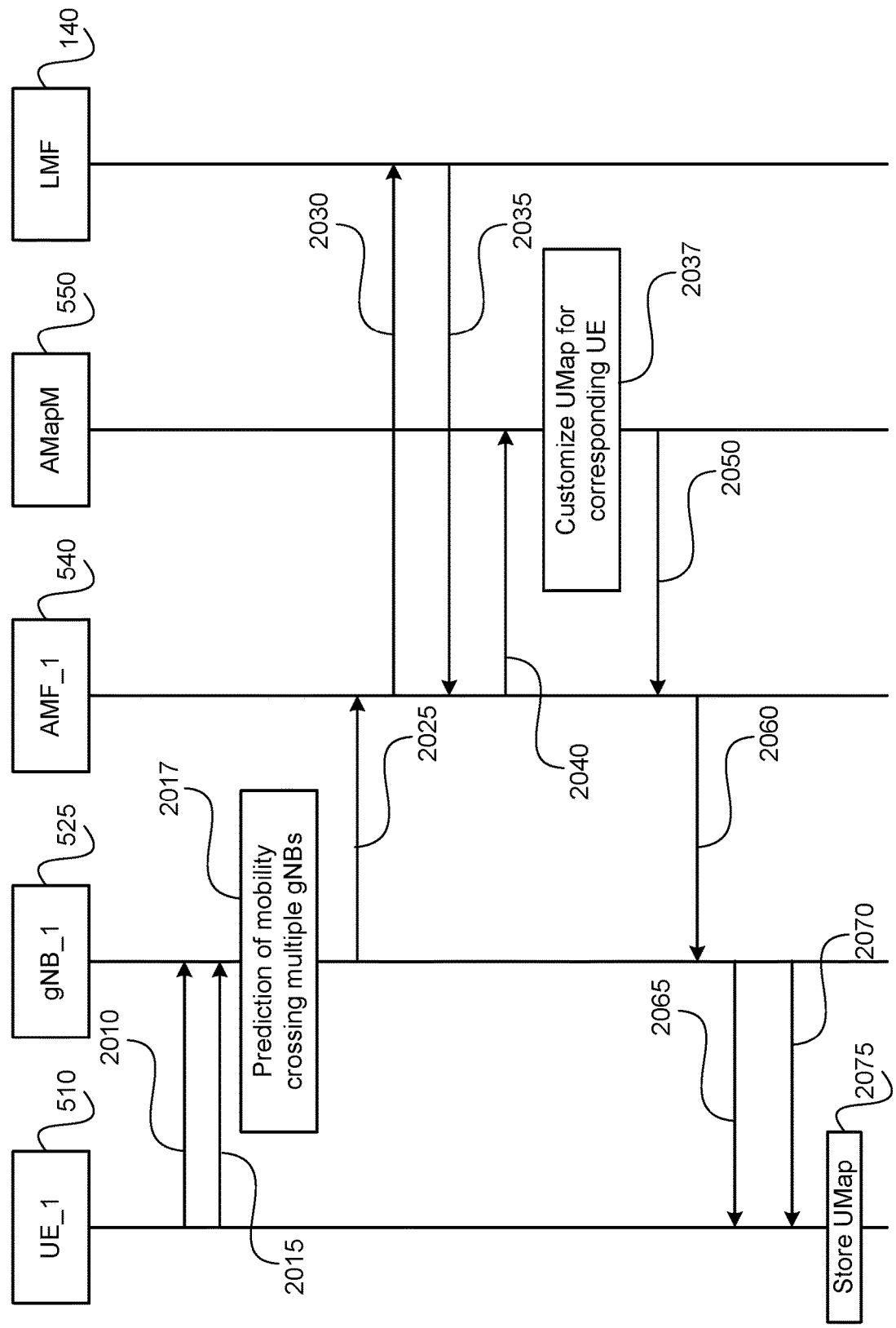
FIG. 20 illustrates a call flow diagram for UMap creation using predicted location by AMapM, according to embodiments of the present invention.

FIG. 20 illustrates a call flow diagram for UMap creation using predicted location by AMapM, according to embodiments of the present invention. UE_1 510 requests a UMap by first transmitting a RRC connection release to gNB_1 525 via signal 2010. UE_1 510 also transmits its UMap request to gNB_1 525 via signal 2010. In some embodiments, the UE_1 510 may transmit its UMap request to gNB_1 525 via signal 2015. UE_1 510 does not include its location in this UMap request. gNB 1 525 then transmits UE_1 510's UMap request, along with the UE's predicted mobility crossing multiple gNBs, determined via Prediction of mobility crossing multiple gNBs 2017, to AMF_1 540 via signal 2025. AMF_1 540 then transmits this information to LMF 140 via signal 2030. LMF 140 then transmits UE_1 510's position information to AMF_1 540 via signal 2035. AMF_1 540 then transmits UE_1 510's UMap request, including UE_1 510's position, to AMapM 550 via signal 2040. AMapM 550 creates 2037 UE_1 510's customized UMap and transmits it to AMF_1 540 via signal 2050. AMF_1 540 then transmits UE_1 510's UMap to gNB_1 525 via signal 2060. gNB_1 525 then transmits UE_1 510's UMap to UE_1 510 via signal 2065. In some embodiments, the gNB 1 525 may transmit the UMap to UE_1 510 via signal 2070. gNB_1 525 also transmits a RRC Connection Setup to UE_1 510 via signal 2070. UE_1 510 stores 2075 the received UMap.

Figure 21:
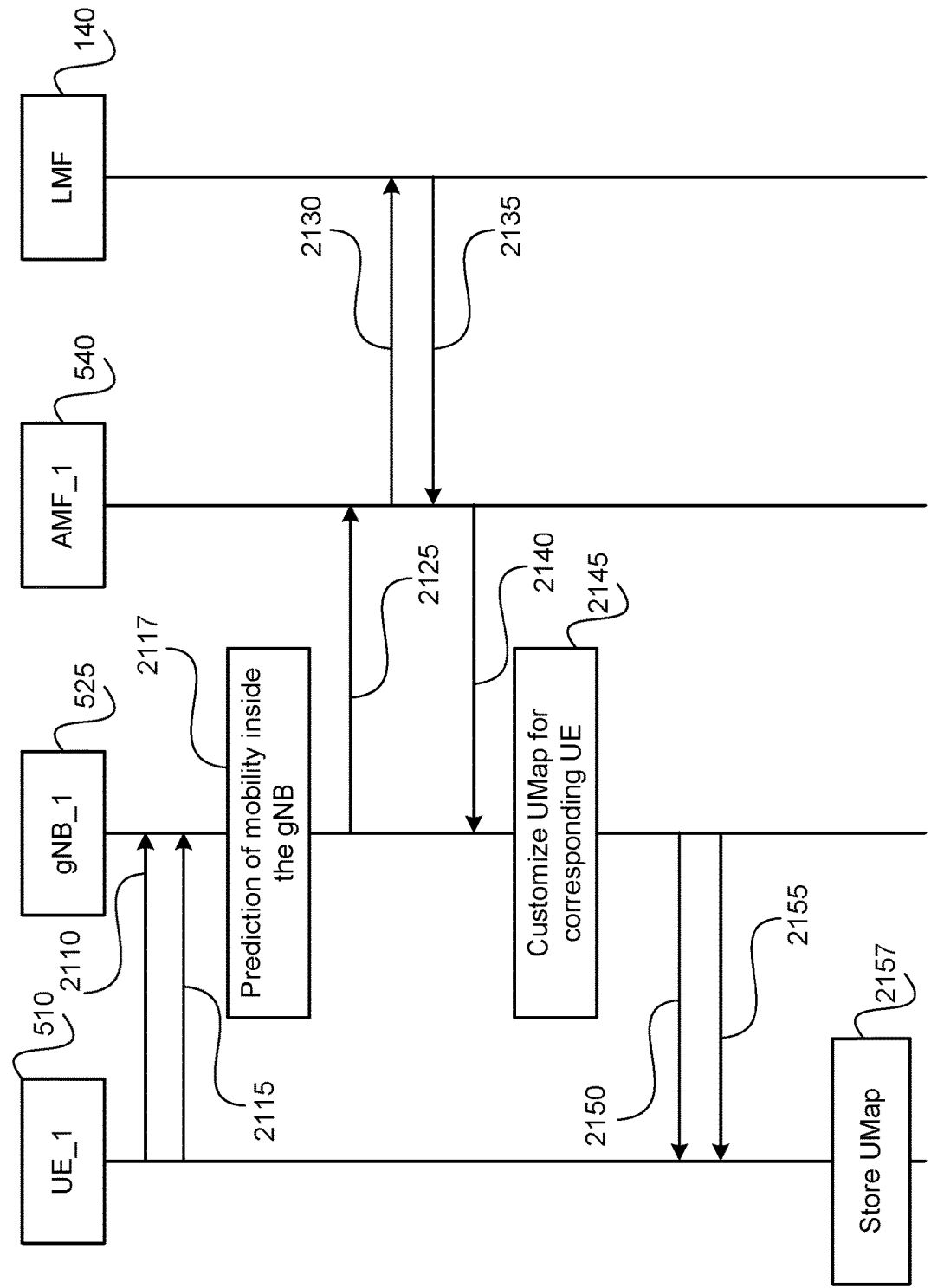
FIG. 21 illustrates a call flow diagram for UMap creation using predicted location by gNB, according to embodiments of the present invention.

FIG. 21 illustrates a call flow diagram for UMap creation using predicted location, according to embodiments of the present invention. UE_1 510 transmits a RRC Connection Request to gNB_1 525 via signal 2110 and also a UMap request, without location information, to gNB_1 525 via signal 2115. gNB_1 525 transmits UE_1 510's UMap request, as well as UE_1 510's predicted mobility inside gNB_1 525's cell area, determined via Prediction of mobility inside the gNB 2117, to AMF_1 540 via signal 2125. AMF_1 540 then requests UE_1 510's position from LMF 140 via signal 2130 and LMF 140 transmits UE_1 510's position information to AMF_1 540 via signal 2135. AMF_1 540 then transmits the UE_1 510 position information received from LMF 140 to gNB_1 525 via signal 2140. gNB_1 525 creates UE_1 510's UMap using the UE_1 510 position information provided by LMF 140. gNB_1 525 then transmits UE_1 510's UMap to UE_1 510 via signal 2150 and also RRC Connection Setup to UE_1 510 via signal 2155. UE_1 510 stores 2157 the received UMap.

The NWDAF in the embodiments of the present invention provides AI analysis and refinement of the AMap's data fields, and therefore, also refinement of GMap's, LMap's, and UMap's data fields. Also, in some embodiments, the data fields in GMap may be different than the data fields in both LMap and UMap. In some embodiments, the predicted UMap UE mobility data that is created or updated by the AMapM may be different than the predicted UMap UE mobility data that is created or updated by the gNB. This difference in predicted UE mobility data occurs when the AMapM predicts UE mobility based on a UE crossing multiple gNBs versus when the gNB predicts mobility based on a UE that only travels within the cell coverage of the serving gNB. This difference in predicted UE mobility data offers flexibility. Predicted UE mobility based on a UE crossing multiple gNBs provides, for example, overload statistics or pre-configured handover data that allows the UE to conduct cell selection. In the alternative, predicted UE mobility based on a UE that only travels within the serving gNB's cell area allows for faster UMap creation.

The previously described GMap, LMap, and UMap AI machine learning update procedures result in constant refinement of GMap, LMap, and UMap data. The refined data fields include RACH related information, UE connection statistics, e.g., Historical Connection Statistics, load statistics and etc., and cell camping information. For example, this constant refinement results in more accurate UE connection information that leads to improved prioritization of candidate cells for cell selection.

Refining/refined data as used in this disclosure may mean aggregating information from multiple UEs and generating the map based on the aggregated information. The 'aggregating' here may include computing statistics (e.g. average, mean, median) using the information received from the multiple UEs. For example, the information from the multiple UEs may be related to different locations, for example, location information 315, that are close to each other (or close to a pre-defined fixed location), and aggregating information may mean computing/performing statistical analysis on the information (e.g. average or mean or median of the power level or time advance) for a center point of those locations (resp. for that pre-defined fixed location). The pre-defined fixed location may be configured in the multiple UEs.

Referring to FIG. 4, UMap used in cell search 445 and UMap used in TA adjustment are procedures that allow a UE to determine its current geographic location based on UMap data. The UE uses this current geographic location as an index into the UMap to retrieve connection related information such as HCS. This information allows the UE to prioritize connection candidates. UEs can also retrieve RACH related information, including transmission power level and time advance, from UMap. UEs may use time advance information from the UMap instead of time advance information from a time advance procedure.

Figure 22:
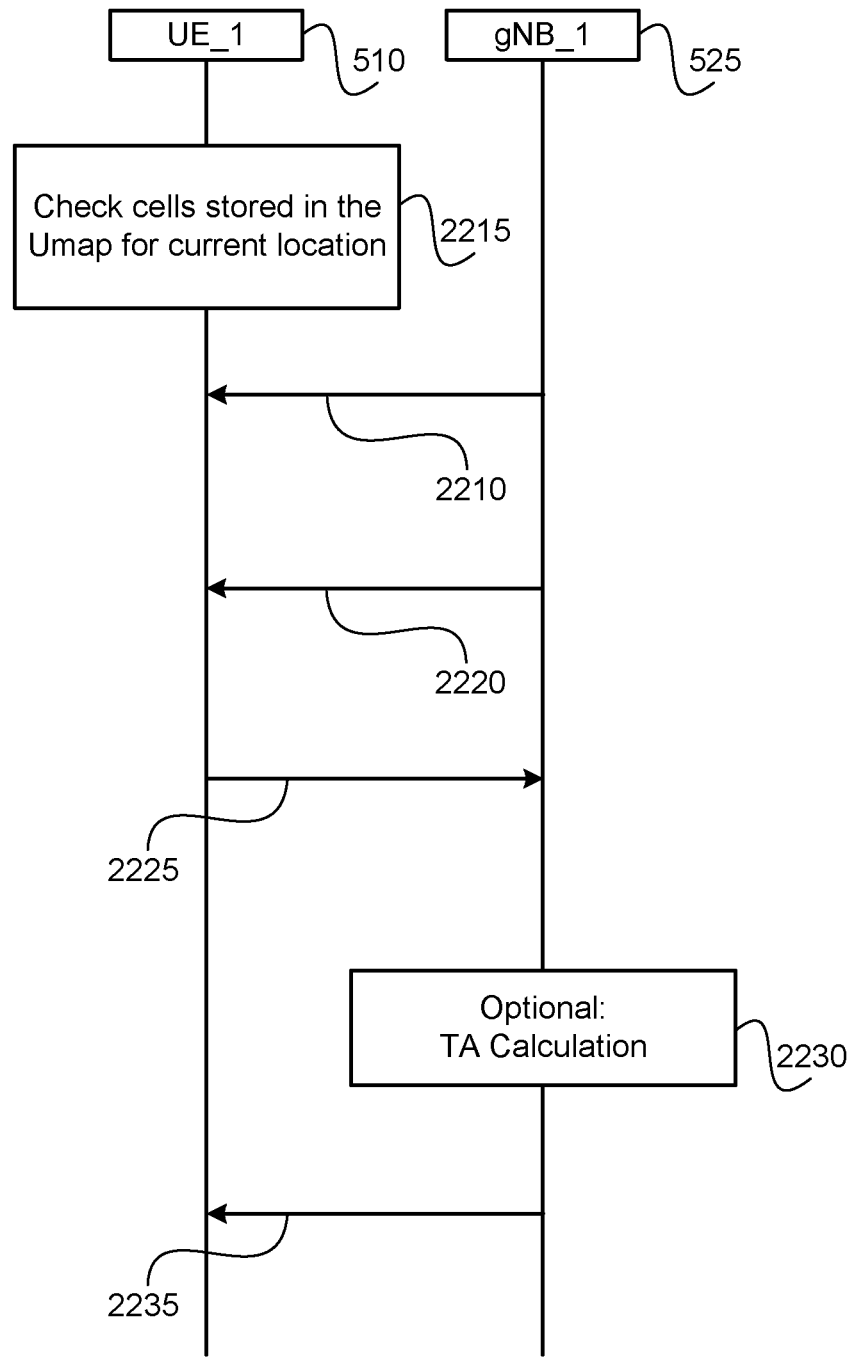
FIG. 22 illustrates a call flow diagram for UE cell search using UMap, according to embodiments of the present invention.

FIG. 22 illustrates a call flow diagram for UE cell search using UMap, according to embodiments of the present invention. gNB_1 525 transmits primary synchronization signals (PSS) and secondary synchronization signals (SSS) to UE_1 510 via signal 2210. PSS and SSS may also be referred to as synchronization signals. UE_1 510 only searches cells stored in the UMap for its current location. gNB_1 525 then transmits Master Information Block (MIB) and System Information Block (SIB) information to UE_1 510 via signal 2220. UE_1 510 responds by transmitting the RACH preamble to gNB_1 525 via signal 2225. The RACH related information transmitted by UE_1 510 includes power level and time advance to save Preamble RACH (PRACH) power ramp up. gNB_1 525 optionally may perform a time advance calculation. gNB_1 525 then transmits a RACH response to UE_1 510 via signal 2235.

In certain embodiments, for example short message uplink transmission with Non Orthogonal Multiple Access (NOMA), UEs may use RACH related information including transmission power, time advance and MCS, to conduct RACH-free uplink transmission. FIG. 4, UMap used in RACH free 440, is the procedure used for the exchange of messages using RACH-free short message uplink NOMA transmission.

Figure 23:
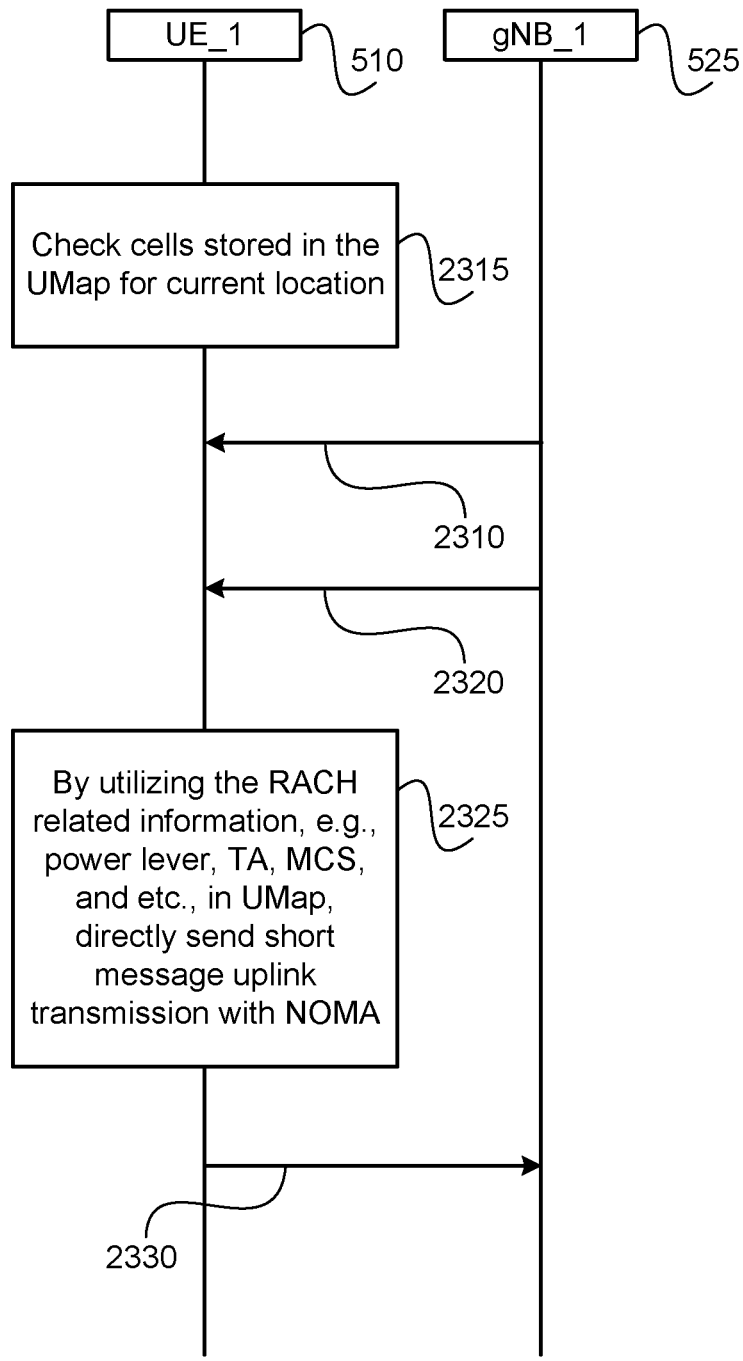
FIG. 23 illustrates a call flow diagram for RACH-free short message NOMA uplink transmission, according to embodiments of the present invention.

FIG. 23 illustrates a call flow diagram for RACH-free short message NOMA uplink transmission, according to embodiments of the present invention. It should be noted that FIG. 23 is an example call flow diagram using NOMA and that this call flow can also be applied when other RAT is used. The term 'RACH-free' means that the RACH procedure/related signals (e.g. signals 2225, 2230, and 2235 in the embodiment of FIG. 22) do not happen in this embodiment. This is because the RACH related information that the UE_1 510 obtains through the RACH procedure/related signals can be obtained from the locally stored map. gNB_1 525 transmits PSS and SSS to UE_1 510 via signal 2310. PSS and SSS may also be referred to as synchronization signals. UE_1 510 only searches cells stored in the UMap for its current location. gNB_1 525 also transmits MIB and SIB to UE_1 510 via signal 2320. Using the RACH related information, including power level, time advance, MCS from UMap, UE_1 510 transmits short message uplink information to gNB_1 525 via signal 2330. The signal 2330 is not limited to only short message uplink information but rather to any UL signal.

It should be noted that the "RACH-free" effect as explained above can also be achieved during handover, in which, the RACH procedure/related signals (with the target RAN node) do not happen as the UE can obtain the RACH related information, which is related to the target RAN node, from the locally stored map. In other words, the UE does not perform the RACH procedure with the target RAN node.

In FIG. 4, UMap used in state transition 455, is a process for state transition of cell reselection. The result of this process is that UEs are no longer required to store historical cell selection because the UMap data is more accurate. In addition, the UMap data enables the UE to camp on a specific cell instead of the UE camping on a randomly chosen a cell.

Figure 24:
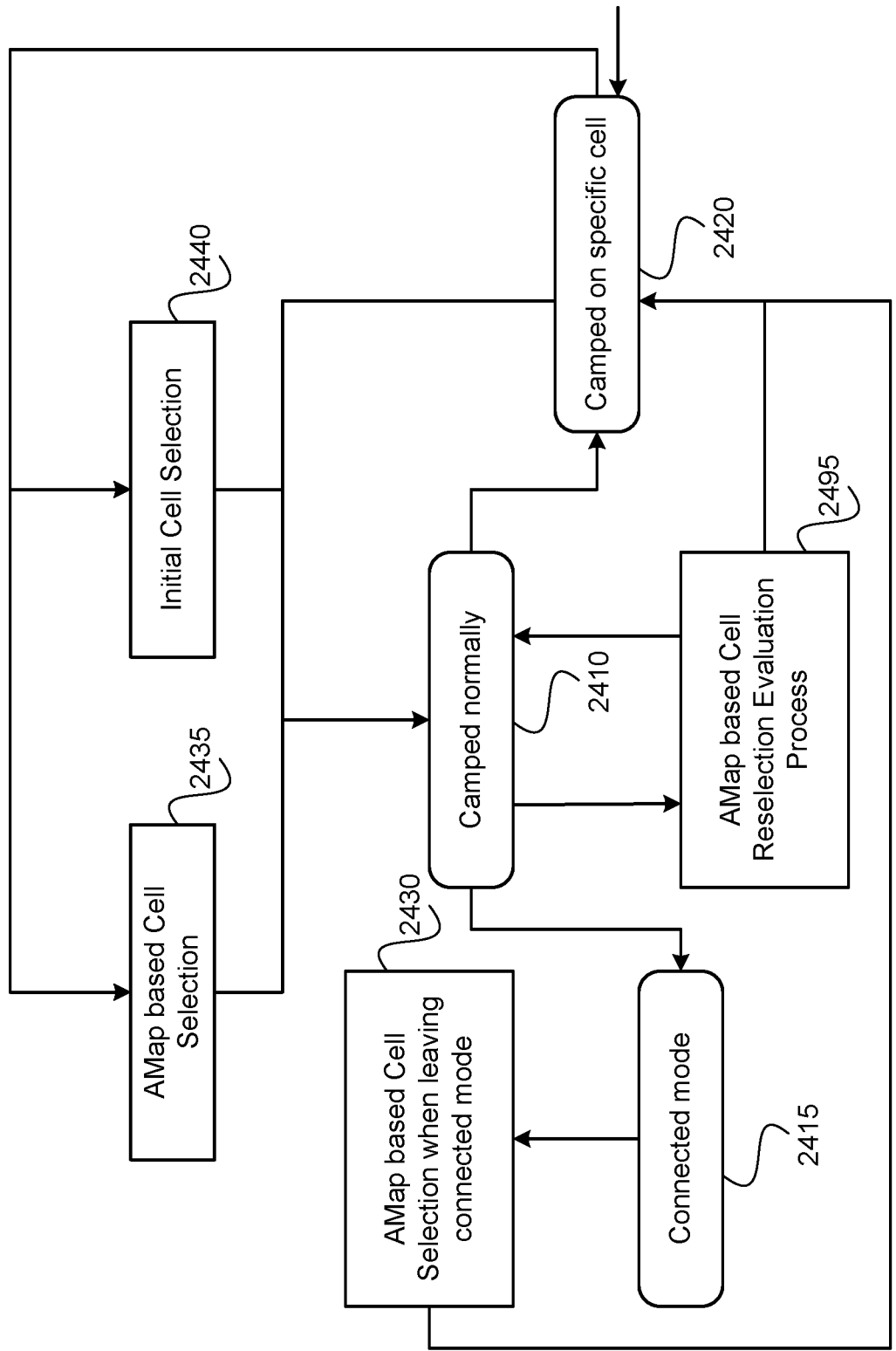
FIG. 24 illustrates a method for state transition of cell reselection using UMap, according to embodiments of the present invention.

FIG. 24 illustrates a method for state transition of cell reselection using UMap, according to embodiments of the present invention. UE is Camped normally 2410 and transitions to Connected mode 2415 when it leaves idle mode. UE then transitions to AMap based Cell Selection when leaving connected mode 2430 when it returns to idle mode. If the UE finds no suitable cell, the UE transitions to Camped on specified cell 2420. When the Universal Subscriber Identity Module USIM is inserted, transition to either Initial Cell Selection 2440 or AMap based Cell Selection 2435. When a suitable cell is found, transition from camped on specified cell 2420, Initial Cell Selection 2440, AMap based Cell Selection 2435, AMap based Cell Reselection Evaluation Process 2495 to Camped normally 2410. When there is no USIM in the UE, transition to Camped on specified cell 2420. When triggered, transition from Camped normally 2410 to AMap based Cell Reselection Evaluation Process 2495.

In other embodiments, when the UE does not have a USIM inserted, the UE may be Camped on specified cell 2420. To insert the USIM, the UE is powered off and the USIM is inserted. When the UE is powered on, the UE transitions to either Initial Cell Selection 2440 or AMap based Cell Selection 2435. When a suitable cell is found, transition from camped on specified cell 2420, Initial Cell Selection 2440, AMap based Cell Selection 2435, AMap based Cell Reselection Evaluation Process 2495 to Camped normally 2410.

FIG. 4, UMap used in pre-configured HO 450 procedure can include pre-configuration of UE handover. In some embodiments, AMapM creates a customized UMap with pre-configured handover information. This pre-configured handover information can be used to initiate handover. Furthermore, this handover information can be stored in the UMap, for example UMap 390 of FIG. 3. Further details will be described with reference to FIG. 25 below. In some embodiments, when the UE crosses a boundary, the pre-configured handover information in the UMap may be used by the UE to begin handover. UE can use the pre-configured handover information when in either the inactive or connected mode. In some embodiments as handover is stored in the UMap, cell measurement is optional. Furthermore, in some embodiments, the handover information refined over time may increase handover efficiency and balance the load between cells.

Figure 25:
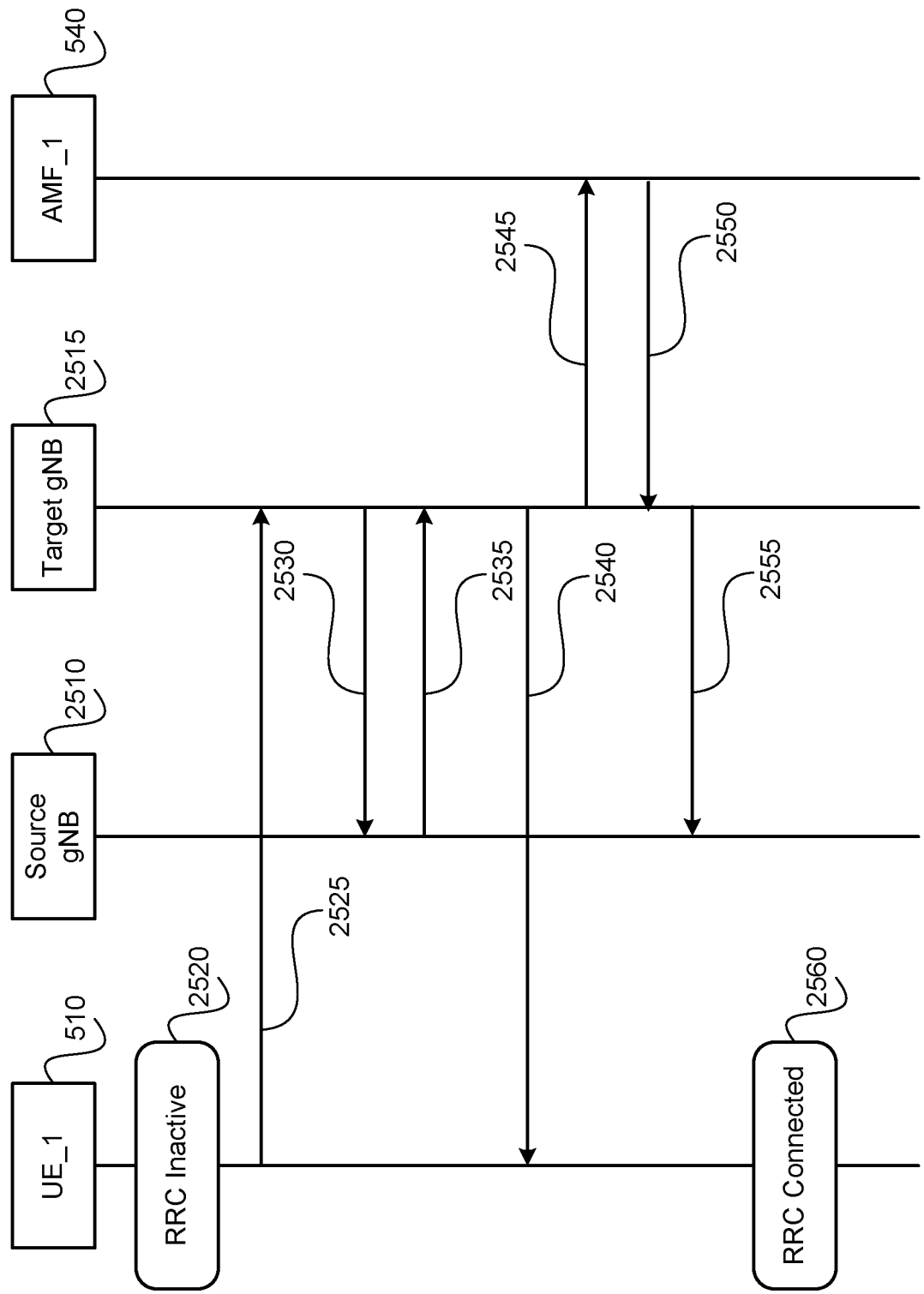
FIG. 25 illustrates a call flow diagram for pre-configured handover (HO) under inactive mode, according to embodiments of the present invention.

FIG. 25 illustrates a call flow diagram for pre-configured handover (HO) under inactive mode, according to embodiments of the present invention. UE_1 510 is in RRC Inactive mode and transmits a RRC connection resume request to Target_gNB 2515 via signal 2525. In response, Target_gNB 2515 transmits a retrieve UE context request to Source_gNB 2510 via signal 2530. Source_gNB 2510 then transmits a retrieve UE context response 2535 to Target_gNB 2515. Target_gNB 2515 then transmits a RRC connection resume to UE_1 510 via signal 2540 and as a result, UE_1 510 becomes RRC connected. Target_gNB 2515 then transmits a path switch request to AMF_1 540 via signal 2545. In response, AMF_1 540 transmits a path switch request response to Target_gNB 2515 via signal 2550. Target_gNB 2515 then transmits a UE context release to Source_gNB 2510 via signal 2555.

Figure 26:
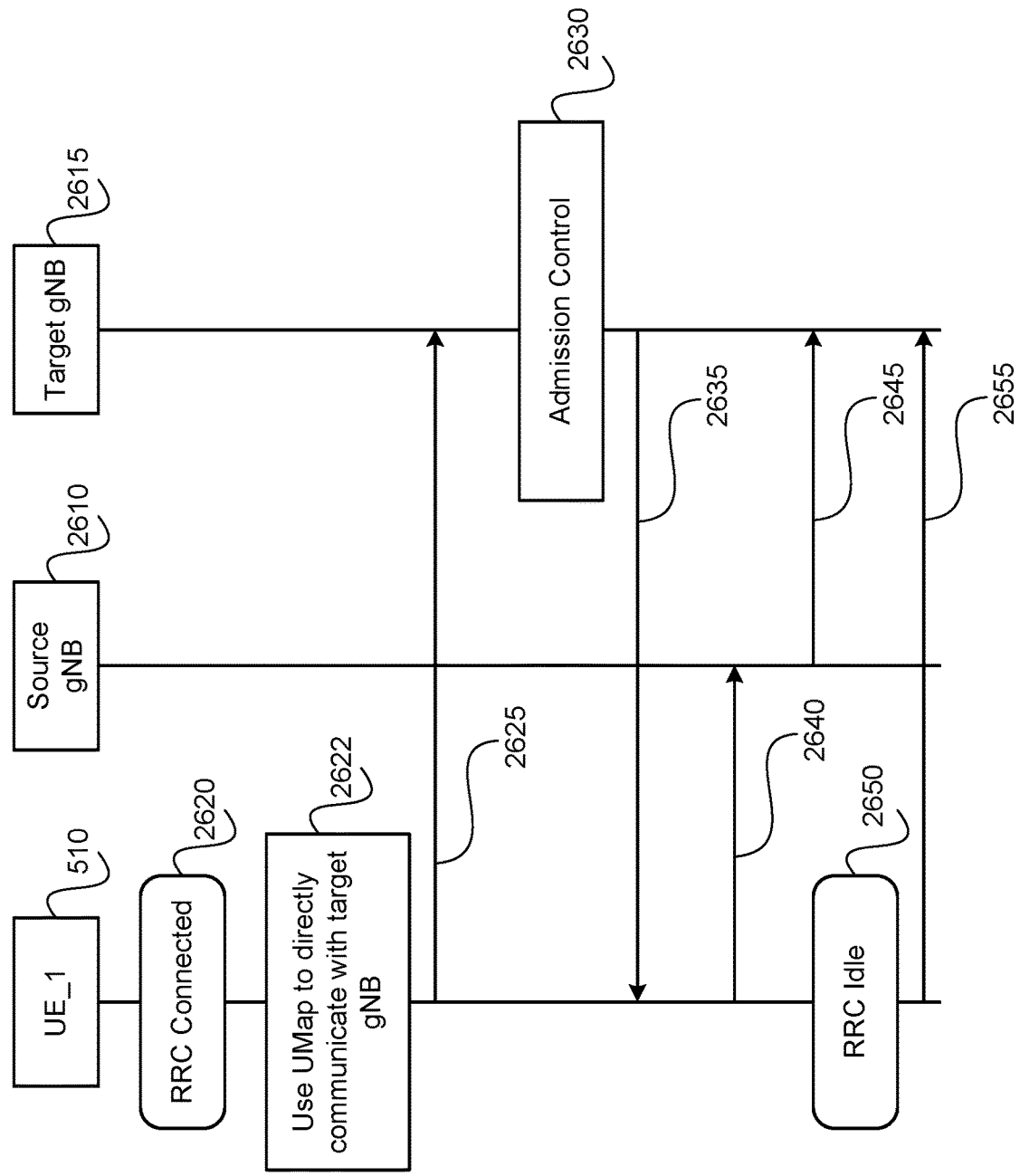
FIG. 26 illustrates a call flow diagram for pre-configured handover under connected mode, according to embodiments of the present invention.

FIG. 26 illustrates a call flow diagram for pre-configured handover under connected mode, according to embodiments of the present invention. UE_1 510 is RCC connected 2620 and transmits a handover request directly to Target_gNB 2615, based on UMap data, via signal 2625. The UE then uses the UMap to directly communicate with target gNB 2622. Target_gNB 2615 conducts admission control 2630 and determines whether to accept UE_1 510 by transmitting handover request acknowledgement to UE_1 510 via signal 2635. UE_1 510 responds by transmitting handover notification to Source_gNB 2610 via signal 2640. Source_gNB 2610 then transmits sequence number (SN) status transfer to Target_gNB 2611 via signal 2645. The SN status transfer that is transmitted by the Source_gNB 2610 may include uplink PDCP SN receiver status and the downlink PDCP SN transmitter status. Then, UE_1 510 turns into RRC_Idle Mode 2650. UE_1 510 transmits RACH preamble to Target_gNB 2615 via signal 2655.

Figure 27A:
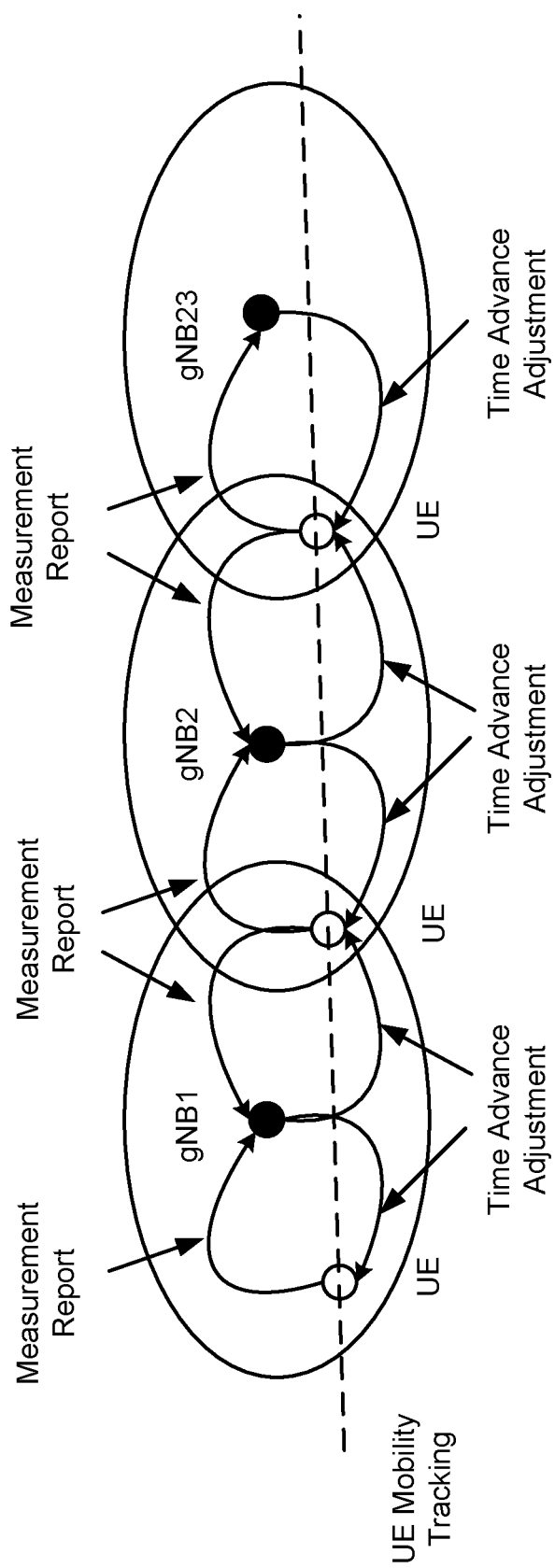
FIG. 27A illustrates measurements performed by a UE for Time Advance (TA) adjustment as the UE moves through the network's cells, according to embodiments of the present invention.

FIG. 27A illustrates measurements performed by a UE for Time Advance (TA) adjustment as the UE moves through the network's cells, according to embodiments of the present invention. In some embodiments, as a UE travels through a network's cells and its physical location changes, the UE performs measurements used for time advance adjustment. These time advance adjustments are used by the UE to determine handover.

Figure 27B:
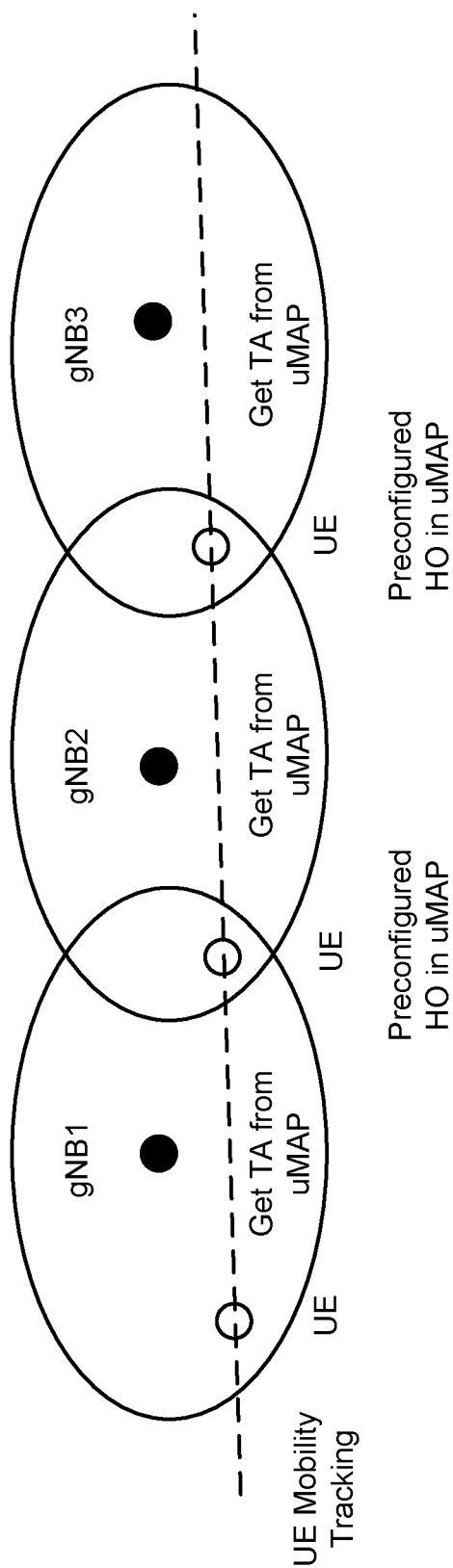
FIG. 27B illustrates a UE's use of UMap Time Advance (TA) for TA adjustment as the UE moves through the network's cells, according to embodiments of the present invention.

FIG. 27B illustrates a UE's use of UMap Time Advance (TA) instead of making TA adjustment measurements as the UE moves through the network's cells, according to embodiments of the present invention. In some embodiments, UE can directly use TA saved in UMap to obtain the correct TA, thus no more TA adjustment is needed. In some embodiments, UMap can include pre-configured handover information, e.g., only include the cells which is the target gNB for handover. When the UE crosses a cell or network boundary, it uses the UMap pre-defined handover and TA to select which gNB it will connect to.

It should be noted that the UE request for UMap creation and/or update (or in other words, to obtain UMap and/or UMap update) in embodiments discussed in this disclosure may be explicit (e.g. a request sent by the UE) or implicit. An implicit UE request may occur when the UE connects or registers to the network and the UE indicates to the network that it has the capability of supporting or using the map. Accordingly, the network provides or updates the map for the UE at the appropriate time. The appropriate time may be when the map that the UE currently has expires or when the UE moves out of the current map area. The appropriate time may also be when the map is needed by the UE during some procedures, for example, a handover procedure in which the UE need not perform RACH procedure because the information that the UE obtains through the RACH procedure is already included in the map. In such a case, a RAN function (at the source RAN node) may provide the map to the UE, and the UE may use the information provided in the map (e.g. power level, time advance) to connect to a target RAN.

When or if UMap creation and/or update is requested by the UE, whether explicitly or implicitly, according to the request the network may optionally configure the RAN or the UE for data collection for supporting map generation (not only for the UE itself but also for other UEs), where the UE has indicated that it is capable of supporting or using the map.

It should also be noted that the map may be customized for the UE based on the UE's supported RAT and mobility, and because of that, in some embodiments the map may not be broadcasted to all UEs unless the UEs share the same map (content and area).

In various embodiments in which a map is generated and transmitted/sent/distributed to a plurality of UEs, the map may include downlink synchronization parameters. Accordingly, the downlink synchronization parameters are part of the transmitted map and may include map information such as carrier information, which include the candidate frequency channels to search or use by a UE. For example, the map information may include the information from FIG. 2, such as carrier/frequency band 11210, 11215, 11220, 12210, 12215, 12230. The UE may then search those channels according to the information provided (otherwise, the UE may search all possible channels, wasting a lot of time and power in cell searching for example).

The map information may also include connection statistics, indicating how likely a particular cell (e.g. identified by a cell ID) is selected by a UE at the location associated to the statistics. Connection statistics may include for example, FIG. 3, Statistics of UE connection information 330, and FIG. 2, historical connection statistics, 11225, 11230, 11235, 12225, 12230, and 12235. Accordingly, the UE may select a particular cell based on the connection statistics. It should be noted that the UE needs to first search for cells and then select a cell among the (found) searched cells. The connection statistics is used for selecting a cell, while the downlink synchronization parameters are used for searching for cells.

As discussed elsewhere herein, the map information may be associated with a location, implying that the information is applicable or valid only at the specified location. For example, and as discussed elsewhere herein in reference to FIG. 2, at location 215, [x1, y1, z1], for cell ID 1, the following map information is provided in the map: carrier/frequency band 11210; historical connection statistics 11225, Power level 11240, time advance 11255 and other map information. Further, the map information may also be associated with a temporal validity condition, indicating when the information is valid or will expire.

Accordingly, the UE 510 may decide whether to use the map information comprising at least one of the downlink synchronization parameters and connection statistics based on its own location and current time, as well as the location and time information associated to the information in the map.

In embodiments discussed in this disclosure, the UE 510 may receive a map comprising of parameters for connecting to the network. These parameters may include uplink transmission parameters such as power level and time advance; and these parameters are associated with locations in the network's coverage area. The UE 510 may utilize the map and the included parameters in transmission to the network. For example, the UE 510 may utilize the received map and the included parameters to send data according to the uplink transmission parameters. The UE 510 may send data using transmission power according to the power level and use transmission timing according to the time advance. In other words, the UE 510 sets the transmission power according to the power level, and adjusts the transmission timing according to the time advance.

Figure 28:
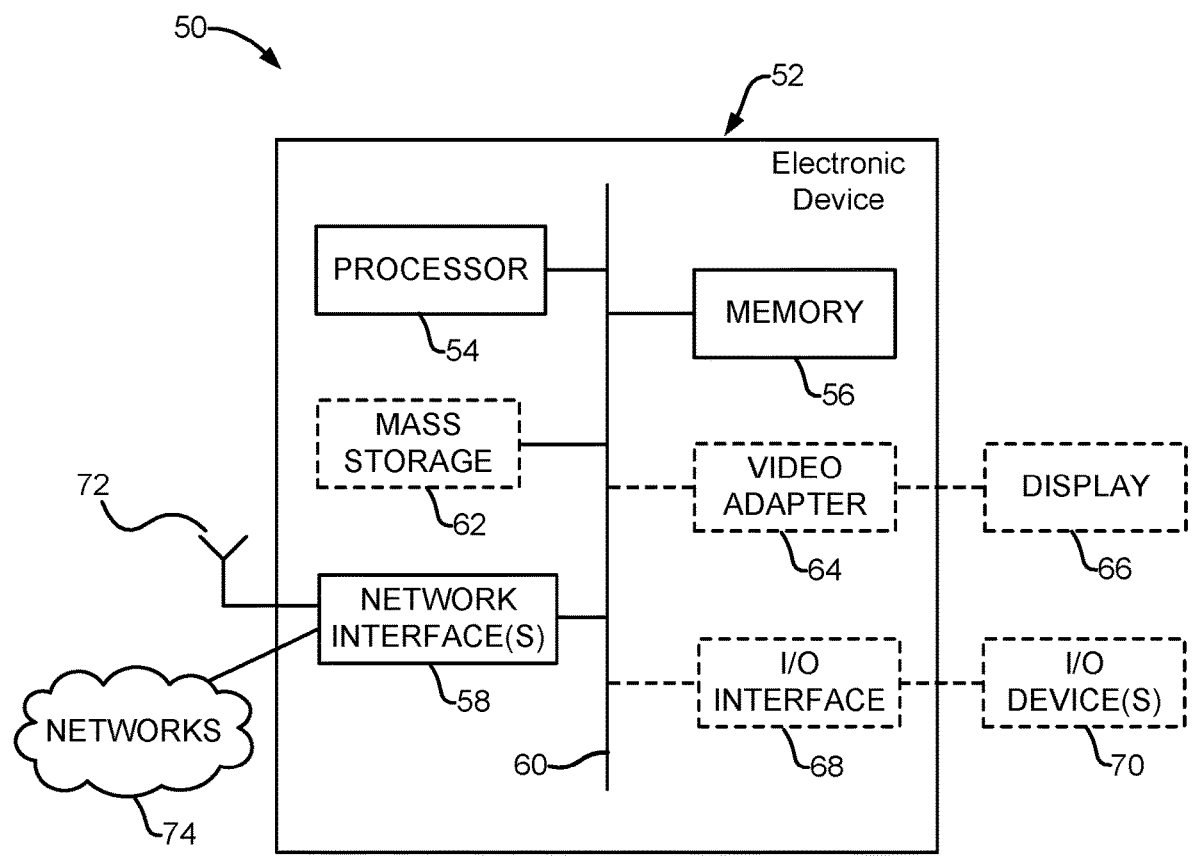
FIG. 28 is a block diagram of an electronic device 52 within a computing and communications environment 50 that may be used for implementing devices and methods in accordance with representative embodiments of the present invention.

FIG. 28 is a block diagram of an electronic device (ED) 52 illustrated within a computing and communications environment 50 that may be used for implementing the devices and methods disclosed herein. In some embodiments, the electronic device could be used for the network element AMapM function. In some embodiments, the electronic device may be an element of communications network infrastructure, such as a base station (for example a NodeB, an evolved Node B (eNodeB, or eNB), a next generation NodeB (sometimes referred to as a gNodeB or gNB), a home subscriber server (HSS), a gateway (GW) such as a packet gateway (PGW) or a serving gateway (SGW) or various other nodes or functions within a core network (CN) or a Public Land Mobility Network (PLMN). In other embodiments, the electronic device may be a device that connects to the network infrastructure over a radio interface, such as a mobile phone, smart phone or other such device that may be classified as a User Equipment (UE). In some embodiments, ED 52 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 52 typically includes a processor 54, such as a Central Processing Unit (CPU), and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed lines).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The electronic device 52 may also include one or more network interfaces 58, which may include at least one of a wired network interface and a wireless network interface. As illustrated in FIG. 28, network interface 58 may include a wired network interface to connect to a network 74, and also may include a radio access network interface 72 for connecting to other devices over a radio link. When ED 52 is a network infrastructure element, the radio access network interface 72 may be omitted for nodes or functions acting as elements of the PLMN other than those at the radio edge (e.g. an eNB). When ED 52 is infrastructure at the radio edge of a network, both wired and wireless network interfaces may be included. When ED 52 is a wirelessly connected device, such as a User Equipment, radio access network interface 72 may be present and it may be supplemented by other wireless interfaces such as WiFi network interfaces. The network interfaces 58 allow the electronic device 52 to communicate with remote entities such as those connected to network 74.

The mass storage 62 may comprise any type of non-transitory storage device configured to store data, programs, and other information and to make the data, programs, and other information accessible via the bus 60. The mass storage 62 may comprise, for example, one or more of a solid state drive, hard disk drive, a magnetic disk drive, or an optical disk drive. In some embodiments, mass storage 62 may be remote to the electronic device 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed lines) provide interfaces to couple the electronic device 52 to external input and output devices. Examples of input and output devices include a display 66 coupled to the video adapter 64 and an I/O device 70 such as a touch-screen coupled to the I/O interface 68. Other devices may be coupled to the electronic device 52, and additional or fewer interfaces may be utilized. For example, a serial interface such as Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, electronic device 52 may be a standalone device, while in other embodiments electronic device 52 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

GMap creation can further include network slice information. In some embodiments, GMap 310 can further include network slice data fields. In some embodiments UMap 390 can further include data fields containing synchronization and transmission parameters for the UE to connect to gNB's included in network slices.

An aspect of the disclosure provides for a method of network access discovery, by a network function, the network function is one of a core network function (CNF) and a radio access network (RAN) function. The method includes receiving information from at least one user equipment (UE), the information associated with at least one location of the at least one UE, and the information including parameters for connecting the at least one UE to a network, the parameters including uplink transmission parameters including at least one of power level and time advance. The method further includes generating at least one map based on the received information. The method further includes sending the at least one map to a plurality of UEs. In some embodiments, the network function is a CNF, and the method further includes receiving information from at least one UE includes the CNF receiving the information from at least one access node (AN). In some embodiments the network function is a CNF and the method further includes sending the at least one map to a plurality of UEs includes the CNF sending, via at least one AN, the at least one map to the plurality of UEs. In some embodiments the CNF is a network data analytic function (NWDAF). In some embodiments the step of generating at least one map based on the received information includes aggregating the received information based on mobility information and capability category of the at least one UE. In some embodiments the step of generating at least one map based on the received information further includes generating at least one map based on the aggregated information. In some embodiments, the capability category includes at least one of: radio access technology (RAT) supported by the at least one UE, carrier frequencies supported by the at least one UE's antennas, and physical area the at least one UE can access. In some embodiments the step of generating at least one map based on the received information includes sending the received information to a network data analytic function (NWDAF). In some embodiments the step of generating at least one map based on the received information further includes receiving aggregated information from the NWDAF. In some embodiments the step of generating at least one map based on the received information further includes generating at least one map based on the received aggregated information. In some embodiments, the information further includes downlink synchronization parameters including carrier information and connection statistics. In some embodiments the at least one map includes map information associated with the locations of the at least one UE. In some embodiments the map information includes at least one of: downlink synchronization parameters including carrier information; and connection statistics. In some embodiments, the map information is associated with a temporal validity condition. In some embodiments, the at least one map sent to each UE is generated based on predicted mobility of each UE. In some embodiments, the method further includes sending the at least one map to at least one UE entering the network's coverage. In some embodiments, the method further includes sending the at least one map to the at least one AN.

Another aspect of the disclosure provides a method of performed by a user equipment (UE). The method includes receiving a map from a network function, the map including parameters for connecting to the network, the parameters associated with at least one location in the network's coverage area, the parameters include uplink transmission parameters including at least one of power level and time advance. The method further includes storing the received map. The method further includes utilizing the received map and the parameters in transmissions to the network. In some embodiments the network function is one of a core network function (CNF) and at least one access node (AN). In some embodiments, utilizing the received map and the parameters in transmissions to the network includes sending data according to the uplink transmission parameters. In some embodiments, sending data according to the uplink transmission parameters includes sending the data using a transmission power according to the power level. In some embodiments, sending data according to the uplink transmission parameters includes sending the data using transmission timing according to the time advance. In some embodiments, the network function is a CNF and receiving a map from a network function includes the UE receiving the map from at least one AN. In some embodiments, the step of utilizing the received map and the parameters in transmissions to the network includes receiving synchronization signals from an AN. In some embodiments, the step of utilizing the received map and the parameters in transmissions to the network further includes receiving master information block (MIB) and system information block (SIB) information from the AN. In some embodiments, the step of utilizing the received map and the parameters in transmissions to the network further includes searching for candidate cells using parameters from the received map based on the UE's location, wherein the parameters include carrier frequency. In some embodiments, the step of utilizing the received map and the parameters in transmissions to the network further includes selecting a cell among the searched candidate cells using parameters including connection statistics parameter. In some embodiments the step of utilizing the received map and the parameters in transmissions to the network includes retrieving connection information from the received map based on the UE's location, and connecting with an AN using the retrieved connection information. In some embodiments, the connection information includes uplink transmission parameters including at least one of power level and time advance. In some embodiments, the method further includes retrieving connection information from the received map based on the UE's location and connecting with an AN using the retrieved connection information. In some embodiments, the connection information includes uplink transmission parameters including at least one of power level and time advance. In some embodiments, the UE is in radio resource control (RRC) inactive mode, the step of utilizing the received map and the parameters in transmissions to the network includes sending an RRC connection resume request to a target AN, and receiving an RRC connection resume response from the target AN. In some embodiments the target AN is determined based on the received map. In some embodiments the UE is in radio resource control (RRC) connected mode, the step of utilizing the received map and the parameters in transmissions to the network includes sending a handover request to a target AN, receiving a handover request acknowledgement form the target AN, sending a handover notification to a source AN, entering into an RRC idle mode, and sending random access channel (RACH) preamble to the target AN. In some embodiments the target AN is determined based on the received map.

Another aspect of the disclosure provides an apparatus, for example a network function, that can perform any method provided above. The network function may include at least one network interface, at least one processor, and a non-transient computer readable memory for storing instructions which when executed by the at least one processor configure the network function to execute the methods described here. For example, such a network function is configured to receive information from at least one user equipment (UE), the information associated with at least one location of the at least one UE, and the information comprising parameters for connecting the at least one UE to a network, the parameters comprising uplink transmission parameters including at least one of power level and time advance. The network function is further configured to generate at least one map based on the received information. The network function is further configured to send the at least one map to a plurality of UEs. In some embodiments, the network function is one of a core network function (CNF) and a radio access network (RAN) function.

Another aspect of the disclosure provides an apparatus, for example a user equipment, that can perform any method provided above. The apparatus may includes at least one network interface, at least one processor, and a non-transient computer readable memory for storing instructions which when executed by the at least one processor configure the user equipment to execute the methods described here. For example, such a user equipment is configured to receive a map from a network function, the map comprising parameters for connecting to the network, the parameters associated with at least one location in the network's coverage area, the parameters include uplink transmission parameters including at least one of power level and time advance. The user equipment is further configured to store the received map. The user equipment is further configured to utilize the received map and the parameters in transmissions to the network.

Another aspect of the disclosure provides a communication system. The communication system includes a network function configured to perform any one of the method provided above, for example, to receive information from at least one user equipment (UE), the information associated with at least one location of the at least one UE, and the information comprising parameters for connecting the at least one UE to a network, the parameters including uplink transmission parameters including at least one of power level and time advance. The network function is further configured to generate at least one map based on the received information. The network function is further configured to send the at least one map to a plurality of UEs. The system further includes a UE to perform any method provided above, for example, to configured to receive a map from a network function, the map comprising parameters for connecting to the network, the parameters associated with at least one location in the network's coverage area, the parameters include uplink transmission parameters including at least one of power level and time advance. The UE is further configured to store the received map. The UE is further configured to utilizing the received map and the parameters in transmissions to the network. In some embodiments the network function is one of a core network function (CNF) and a radio access network (RAN) function.

It should be appreciated that in some embodiments, the communication system can be configured to execute the methods described herein.

Although the present disclosure has been described with reference to specific features and embodiments thereof, it is evident that various modifications and combinations can be made thereto without departing from the disclosure. The specification and drawings are, accordingly, to be regarded simply as an illustration of examples of an invention defined by the appended claims, and are contemplated to cover any and all modifications, variations, combinations or equivalents that fall within the scope of the present disclosure.

We claim:

1. A method of network access, by a network function, comprising:
   receiving information from at least one user equipment (UE), the information comprising location information and parameters for connecting the at least one UE to a network, the location information including a current location of the at least one UE, the parameters associated with the current location and comprising uplink transmission parameters including at least one of power level and time advance;
   generating at least one map based on the received information; and
   sending the at least one map to a plurality of UEs for connecting to the network via a random access channel (RACH)-free connection;
   wherein the network function is one of a core network function (CNF) and a radio access network (RAN) function.

2. The method of claim 1, wherein:
   the network function is a CNF;
   the receiving information from at least one UE comprises the CNF receiving the information from at least one access node (AN); and
   the sending the at least one map to a plurality of UEs comprises the CNF sending, via the at least one AN, the at least one map to the plurality of UEs.

3. The method of claim 2, wherein the CNF is a network data analytic function (NWDAF).

4. The method of claim 1, wherein the generating at least one map based on the received information comprises:
   aggregating the received information based on the location information, the parameters received and capability category of the at least one UE; and
   generating at least one map based on the aggregated information.

5. The method of claim 4, wherein the capability category comprises at least one of:
   radio access technology (RAT) supported by the at least one UE;
   carrier frequencies supported by the at least one UE's antennas; and
   physical area the at least one UE can access.

6. The method of claim 1, wherein the generating at least one map based on the received information comprises:
   sending the received information to a network data analytic function (NWDAF);
   receiving aggregated information from the NWDAF; and
   generating at least one map based on the received aggregated information.

7. The method of claim 1, wherein the information further comprises downlink synchronization parameters comprising carrier information and connection statistics.

8. The method of claim 1, wherein the at least one map comprises map information comprising at least one of:
   downlink synchronization parameters including carrier information; and
   connection statistics;
   wherein the map information is associated with the location information of the at least one UE.

9. The method of claim 8, wherein the map information is associated with a temporal validity condition.

10. The method of claim 7, wherein the at least one map sent to each UE is generated based on predicted mobility of each UE.

11. The method of claim 7, further comprising, sending the at least one map to at least one UE entering the network's coverage.

12. The method of claim 7, further comprising, sending the at least one map to the at least one AN.

13. A method by a user equipment (UE), the method comprising:
   receiving a map from a network function, the map comprising parameters for connecting to a network, the parameters associated with at least one location in the network's coverage area, the parameters include uplink transmission parameters including at least one of power level and time advance;
   storing the received map; and
   connecting to the network, via a random access channel (RACH)-free connection, the connecting comprising utilizing the received map, a current location of the UE, and the parameters to connect to the network;
   wherein the network function is one of a core network function (CNF) and at least one access node (AN).

14. The method of claim 13, wherein the utilizing the received map, a current location of the UE, and the parameters to connect to the network comprises sending data according to the uplink transmission parameters based on the current location.

15. The method of claim 14, wherein the sending data according to the uplink transmission parameters comprises sending the data using a transmission power according to the power level.

16. The method of claim 14, wherein the sending data according to the uplink transmission parameters comprises sending the data using transmission timing according to the time advance.

17. The method of claim 13, wherein:
   the network function is a CNF; and
   the receiving a map from a network function comprises the UE receiving the map from at least one AN.

18. The method of claim 13, wherein the utilizing the received map, a current location of the UE, and the parameters to connect to the network comprises:
   receiving synchronization signals from an access node (AN);
   receiving master information block (MIB) and system information block (SIB) information from the AN;
   searching for candidate cells using parameters from the received map based on the UE's location, wherein the parameters include carrier frequency; and
   selecting a cell among the searched candidate cells using parameters including connection statistics parameter.

19. The method of claim 13, wherein the utilizing the received map, a current location of the UE, and the parameters to connect to the network comprises:
   retrieving connection information from the received map based on the UE's location; and
   connecting with an access node (AN) using the retrieved connection information;

wherein the connection information comprises the uplink transmission parameters including at least one of power level and time advance.

20. The method of claim 19, further comprising:
retrieving connection information from the received map based on the UE's location; and
connecting with an AN using the retrieved connection information;
wherein the connection information comprises the uplink transmission parameters including at least one of power level and time advance.

21. The method of claim 13, wherein the UE is in radio resource control (RRC) inactive mode, the utilizing the received map, a current location of the UE, and the parameters to connect to the network comprises:
sending an RRC connection resume request to a target access node (AN); and
receiving an RRC connection resume response from the target AN;
wherein the target AN is determined based on the received map.

22. The method of claim 13, wherein the UE is in radio resource control (RRC) connected mode, the utilizing the received map, a current location of the UE and the parameters to connect to the network comprises:
sending a handover request to a target access node (AN);
receiving a handover request acknowledgement from the target AN;
sending a handover notification to a source AN;
entering into an RRC idle mode; and
sending random access channel (RACH) preamble to the target AN using the uplink transmission parameters based on the current location of the UE;
wherein the target AN is determined based on the received map.

23. A communication system comprising:
a network function configured to:
receive information from at least one user equipment (UE), the information comprising location information and a first set of parameters for connecting the at least one UE to a network, the location information including a current location of the at least one UE, the first set of parameters associated with the current location and including uplink transmission parameters including at least one of power level and time advance;
generate at least one map based on the received information; and
send the at least one map to a plurality of UEs for connecting to the network via a random access channel (RACH)-free connection;
the at least one UE configured to:
receive the at least one map from the network function, the at least one map comprising a second set of parameters for connecting to the network, the second set of parameters associated with at least one location in the network's coverage area, the second set of parameters including uplink transmission parameters including at least one of power level and time advance;
store the received map; and
connecting to the network, via a RACH-free connection, the connecting comprising utilizing the received map, a current location of the at least one UE, and the second set of parameters to connect to the network;
wherein the network function is one of a core network function (CNF) and a radio access network (RAN) function.

* * * * *